United States Patent
Yan et al.

(10) Patent No.: US 10,834,442 B2
(45) Date of Patent: *Nov. 10, 2020

(54) SYSTEMS AND METHODS FOR ALTERING A PROGRESS BAR TO PREVENT SPOILERS IN A MEDIA ASSET

(71) Applicant: Rovi Guides, Inc., San Jose, CA (US)

(72) Inventors: Thomas Kang-Po Yan, Lexington, MA (US); Hong-Qi Jia, Dedham, MA (US); Peter Boonstra, Arlington, MA (US); Kerui Chen, Somerville, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/287,961

(22) Filed: Feb. 27, 2019

(65) Prior Publication Data
US 2020/0007913 A1 Jan. 2, 2020

Related U.S. Application Data

(63) Continuation of application No. 16/023,944, filed on Jun. 29, 2018, now Pat. No. 10,257,547.

(51) Int. Cl.
| | |
|---|---|
| *H04N 21/2343* | (2011.01) |
| *H04N 21/431* | (2011.01) |
| *H04N 21/845* | (2011.01) |
| *H04N 21/482* | (2011.01) |
| *H04N 21/472* | (2011.01) |

(52) U.S. Cl.
CPC . *H04N 21/234345* (2013.01); *H04N 21/4312* (2013.01); *H04N 21/47217* (2013.01); *H04N 21/4821* (2013.01); *H04N 21/8456* (2013.01)

(58) Field of Classification Search
CPC ....... H04N 21/234345; H04N 21/4312; H04N 21/47217; H04N 21/4821; H04N 21/8456
See application file for complete search history.

(56) References Cited

U.S. PATENT DOCUMENTS

| | | | |
|---|---|---|---|
| 2014/0101244 A1* | 4/2014 | Klein | G06Q 10/101 709/204 |
| 2018/0199080 A1* | 7/2018 | Jackson, Jr. | H04N 21/2187 |

* cited by examiner

*Primary Examiner* — Omar S Parra
(74) *Attorney, Agent, or Firm* — Haley Guiliano LLP

(57) ABSTRACT

Systems and methods are disclosed for altering or otherwise obscuring a progress bar to prevent spoilers in a media asset. A media asset is generated for display and an input is detected from a user during playback of the media asset. A determination is made whether the input comprises a command to display a progress bar. In the affirmative, a determination regarding a current point of playback of the media asset and the type of segment is made. An entry is retrieved from a database that maps the type of segment to a range of time. A determination is made whether the remaining time of the media asset is within the range of time. In the affirmative, a determination whether displaying the progress bar would spoil the media asset is made. In response to determining that displaying the progress bar would spoil the media asset, the progress bar is refrained from generating display.

20 Claims, 12 Drawing Sheets

SYSTEMS AND METHODS FOR ALTERING A PROGRESS BAR TO PREVENT SPOILERS IN A MEDIA ASSET

CROSS-REFERENCE TO RELATED APPLICATION

This application is a continuation of U.S. patent application Ser. No. 16/023,944, filed Jun. 29, 2018 (allowed). The disclosure of which is hereby incorporated by reference herein in its entirety.

BACKGROUND

Media assets are available to users in a myriad of ways, from traditional linear programming, to time-shifted and over-the-top content. When media is time-shifted or delivered as over-the-top content, users are generally provided an ability to view a progress bar that includes information about the user's progress through the media. However, a pervasive problem which exists for viewing such content is the potential of a spoiler caused by the mere display of the progress bar. For example, a progress bar may contain information, such as an elapsed or remaining time of a media asset which may implicitly, or explicitly, include information which leads to spoilage of the media asset for a user. For example, in a tightly contested sports match with a regulation time of 60 minutes, if the progress bar indicates that the run-time of the match is 90 minutes, then the mere display of the run-time may spoil the fact that the sports match will be played beyond regulation time and will have an overtime segment.

Conventional solutions to avoiding spoilers do not address preventing spoilage from the mere display of a progress bar, and instead generally rely on manipulating playback of a media asset itself to prevent spoilage, or manipulating the media asset itself to remove any compromising portions or the entirety of the media asset. For example, one conventional solution to avoiding spoilers is to, following a resume command received during a fast-forward navigation command, modify the resumption point to occur prior to or after a potential spoiler scene in a media asset. However, these conventional solutions do not provide any spoilage prevention by altering or otherwise obscuring information from a progress bar itself during viewing of media assets.

SUMMARY

To improve user interaction with the progress bar by maintaining navigation functionality whilst simultaneously preventing display of visual indication causing potential spoilage, systems and methods are provided herein for altering or otherwise obscuring a progress bar as necessary to prevent spoilers in a media asset. The techniques disclosed herein allow for a user, by coordinating with the media guidance application, to effectively enhance the user interface functionality to overcome current barriers by coordinating with a media guidance application to selectively determine whether, and when, to alter the progress bar, or to maintain usual progress bar functionality.

One example of a media guidance application coordinating with a media asset to determine whether displaying the progress bar would spoil the media asset, occurs when the media asset nears the completion of its playback. For example, the media guidance application may detect an input from a user to alter an aspect of the media asset (e.g., scrub forward, rewind, or pause) that necessitates display of the progress bar user interface. The media guidance application detects the user command input, and responsively, the media guidance application determines the current point of playback of the media asset. If the current point of playback falls within a range of time which is deemed likely to spoil the media asset, the media guidance application refrains from generating display of the progress bar upon the command being detected. By the media guidance application refraining from displaying the progress bar, specific information within the media content which may be displayed on the progress bar is prevented from "spoiling" the viewing experience of the viewer.

Accordingly systems and methods are provided herein for altering or otherwise obscuring a progress bar to prevent the progress bar itself from spoiling the viewing experience. In some aspects of the disclosure, the media guidance application may generate for display a media asset. The media guidance application may detect user input during playback of the media asset, and may determine a segment of the media asset and the current point of playback within the media asset. The media guidance application may determine the type of segment. Subsequently, the media guidance application may retrieve an entry that maps the type of segment to a range of time from a database. The media guidance application may compute a remaining time of the media asset by subtracting the current point of playback from a total playback time of the media asset. The media guidance application may determine whether the time remaining of the media asset is within the range of time. If the media guidance application determines that the time remaining is within the range of time, the media guidance application further may determine, whether display of the progress bar would spoil the media asset. The media guidance application may refrain generation of displaying the progress bar based on the command, in response to the determination that display of the progress bar would spoil the media asset.

As a high-level example of how the system may work as a whole, a media guidance application may generate for display a recorded hockey game (e.g., recorded on a digital video recorder (DVR)). Following this example, early in the hockey game, the media guidance application detects an input from an input device to the media guidance application (e.g., where the input device may be the user's mobile phone running a "remote control" application for the media guidance application) to initiate a command to pause the hockey game. The media guidance application determines the current point of playback of the hockey game, which has elapsed 15 minutes of a total 140 minutes of recorded time. The media guidance application determines the type of segment where the media guidance application receives metadata from the media asset indicating that this is an National Hockey League game between the San Jose Sharks and the Los Angeles Kings and the current segment contains no information indicating potential spoilage. The media guidance application interfaces with a database to retrieve a range of time—in this case, the range of time is 100 minutes (which equates to mid-$3^{rd}$ period of the hockey game). The media guidance application computes whether the current position exceeds the range of time. In this example, being 15 minutes into the hockey game does not exceed 100 minutes and thus the media guidance application takes no action to refrain generation of display of the progress bar. The media guidance application provides display of the progress bar such that an elapsed time display as well as a relative time indicator notch on a horizontal bar indicating the position of the media asset within the completion of the pre-recorded media asset is displayed.

Following this example, towards the end of the hockey game when the user is 110 minutes into the media asset, the Los Angeles Kings are leading by 1 goal with little time remaining in the hockey game. If the media guidance application, at this point in time, receives a user command, the comparison of the current position would exceed 100 minutes and a second determination is made as to whether the progress bar would spoil the media asset. The media guidance application determines, as discussed previously, that a display of the progress bar displaying the remaining time would spoil the outcome for the user as the user would be able to deduce whether the game finishes in regulation time or gets extended into overtime. Thus, upon the user's command to open the progress bar, the media guidance application ensures refraining from generating display of the progress bar as the elapsed time component is removed and the indicator notch is absent from the horizontal bar indicating the position of the media, while the remaining interface remains displayed in order to allow for easy navigation of the user interface.

In some embodiments of the disclosure, the media guidance application may generate for display the media asset. For example, the media guidance application may generate for display a National Hockey League hockey game featuring the San Jose Sharks versus the Los Angeles Kings.

In some embodiments, the media guidance application may detect input from a user during playback of the media asset. For example, the media guidance application may detect a user, using their mobile phone as a remote control application for the media guidance application to commanding the hockey game to pause. In response to detection of the user input, the media guidance application may initiate processes to ensure no spoilage of the media asset is displayed to the user.

In some embodiments, the media guidance application may determine whether the input comprises a command to display a progress bar indicating progress of the playback of the media asset. For example, in response to receiving a command to power off the DVR through the media guidance application, the media guidance application may determine that the input does not comprise a command to display the progress bar. However, if the received command is to pause the hockey game, the media guidance application displays the progress bar. By determination of the user input comprising a command to display the progress bar, the media guidance application can initiate processes to ensure no spoilage of the media asset is displayed to the user.

In some embodiments, in response to determining that the user input comprises the command to display the progress bar, the media guidance application determines the current point of playback of the media asset. For example, the media guidance application determines that the hockey game has elapsed to 110 minutes. By determination of the elapsed time, the media guidance application utilizes this information for comparison to a range of time to determine if displaying the progress bar may spoil the media asset.

In some embodiments, the media guidance application may determine a segment of the media asset comprising the current point of playback. For example, the media guidance application may determine the segment of the hockey game comprising the current point of playback (e.g., 110 minutes in). This would indicate that this is $3^{rd}$ period in the hockey game nearing completion and the corresponding segment would be the last segment of the pre-recorded media asset. By determining the segment within the media asset, different pre-determined priority schemes may be implemented to determine if displaying the progress bar would spoil the media asset.

In some embodiments, the media guidance application may determine the type of segment of the media asset. For example, the media guidance application may retrieve metadata of the segment. The media guidance application may determine whether the retrieved metadata contains information indicative of, for example, the current hockey game is a meaningful hockey game for playoff positioning, and/or whether time remaining indicates that the game is likely to be extended into overtime. Responsive to this information contained within the metadata, the media guidance application may determine a type of segment of the media asset. By determining the type of segment within the media asset, additional information may be utilized to determine if displaying the progress bar may spoil the media asset.

In some embodiments, the media guidance application may retrieve, from a database, an entry that maps the type of segment to a range of time. For example, the media guidance application may determine that the type of segment is a meaningful hockey game for playoff positioning and the current score and time remaining indicates that the game is likely to be extended into overtime. This additional information is retrieved from a database and provides for a corresponding range of time (e.g., 130 minutes). By determining a specific range of time based on specific type of segment, a more accurate range of time can be mapped to a type of segment within the media asset to determine if displaying the progress bar may spoil the media asset.

In some embodiments, the media guidance application may compute a remaining time of the media asset by subtracting the current point of playback from a total playback time of the media asset. For example, the media guidance application may determine the current point of playback is 135 minutes elapsed and the total playback time of the hockey game is 140 minutes. The media guidance application may compute, based on these values, that there are only 5 minutes remaining in the hockey game. As stated above, by determining a specific range of time based on the specific type of segment, a more accurate range of time can be mapped to a type of segment within the media asset to determine if displaying the progress bar may spoil the media asset.

In some embodiments, the media guidance application may determine whether the remaining time of the media asset is within the range of time. For example, the media guidance application may have retrieved a range of time from the database earlier with a value of 130 minutes. The media guidance application may determine that the remaining time in the media asset is 5 minutes. Therefore, the media guidance application may determine that 5 minutes is within the 130 minutes range of time. If the media guidance application determines that the remaining time was 140 minutes, then the media guidance application may go on to determine that this value is outside the retrieved range of time.

In some embodiments, the media guidance application may further determine that displaying the progress bar would spoil the media asset in response to determining that the remaining time of the media asset is within the range of time. For example, based on the previous information, if the media guidance application determines that 5 minutes remain within the hockey game, the media guidance application may determine that display of the progress bar would spoil the media asset as the user will know whether overtime is ensuing, or not, based on viewing the length and/or time indicators of the progress bar.

In some embodiments, the media guidance application may refrain from generating for display the progress bar based on the command (e.g., pause) in response to determining that displaying the progress bar would spoil the media asset. Continuing from the example above, the media guidance application may not display the progress bar as displaying the progress bar may spoil the media asset with the display allowing the user to discern the remaining length of the hockey game based on the remaining time indicator and/or visually estimating the time remaining by the indicator notch on the horizontal progress bar. Having the media guidance application refraining from generating display of the progress bar based on the command in response to determining that displaying the progress bar would spoil the media asset, functionality of navigation in the media guidance application of the user interface is maintained to the user while prevention of spoilage being displayed.

In some embodiments, the media guidance application may determine the type of segment by retrieving metadata corresponding to the segment from a database. The media guidance application may determine whether the metadata matches a predetermined segment type, and may assign the matching predetermined segment type to the segment. For example, the media guidance application may retrieve metadata from the hockey game from a database which returns that the hockey game is a playoff game. This information is used to classify the segment as a high priority segment. By being able to further classify the type of segment, the media guidance application may be able to more accurately determine when to refrain from generating display of the progress bar.

In some embodiments, the media guidance application may utilize a fingerprint of a segment to determine whether the metadata matches the predetermined segment type. Specifically, the media guidance application may determine a plurality of characteristics of the fingerprint and compares each characteristic to entries of the database that map a given characteristic to a given type. Based on this mapping, the media guidance application determines whether a characteristic matches the predetermined segment type category. Similar to the above example, the media guidance application may use a fingerprint of the hockey game and compare the fingerprint to entries from a database to determine characteristics of the hockey game. Similarly, by being able to further classify the type of segment, the media guidance application may be able to more accurately determine when to refrain from generating display of the progress bar.

In some embodiments, the media guidance application may utilize transcript information to determine the type of segment. Specifically, the media guidance application may retrieve transcript information corresponding to the media asset and determine a portion of the transcript that corresponds to the segment. The media guidance application may then extract words of the portion that match any candidate type of a plurality of candidate predetermined segment types. The media guidance application may then determine a candidate type that matches a highest amount of the extracted words, and assign the candidate type to the segment. For example, the media guidance application may use closed captioning information for the hockey game as the transcript information and extract the closed captioning information including the words "playoffs" and "post-season", for the specific segment, and determine a match to a candidate type (e.g., playoff candidate type). Similarly, by being able to further classify the type of segment, the media guidance application may be able to more accurately determine a range of time to provide a more accurate measure of when to refrain from generating display of the progress bar.

In some embodiments, the media guidance application may refrain from generating display of the progress bar by determining a duration of the segment (based on a start time and a completion time of the segment) and generate a progress bar overlay comprising a progress bar indicator for the duration of the segment. The progress bar indicator visually displays the current point of playback along the progress bar. The media guidance application may then determine the position of the progress bar within the media asset and positions the progress bar overlay in the position of the progress bar, wherein the progress bar overlay overlaps at least a portion of the progress bar. The media guidance application may generate for display a notification indicating a progress bar alteration. For example, during the hockey match, the media guidance application may position a progress bar overlay to completely replace the position of the conventional progress bar which displays the progress bar indicator (for the segment only, not the entire playback of the hockey game) on a horizontal progress bar without any time information. Additionally, the media guidance application may output a pop-up message to the screen that the progress bar has been altered. By refraining from generating display of the progress bar based on the command in response to determining that displaying the progress bar would spoil the media asset, functionality of navigation of the user interface is maintained for the user while ensuring prevention of spoilage from being displayed.

In some embodiments, the media guidance application may refrain from generating for display the progress bar by detecting whether the progress bar includes an elapsed time indicator, and in the affirmative, removing from display of the progress bar the elapsed time indicator for the media asset. In some further embodiments, the media guidance application further determines the specific type of elapsed time indicator. Based on a determination of the specific type of the elapsed time indicator, the media guidance application retrieves a specific removal action. For example, if the hockey game is close to an overtime period, the media guidance application may refrain from generating display of a time remaining indicator on the progress bar (e.g., a particular type of elapsed time indicator) as it may hint at a completion time which may be a spoiler for a user. As stated above, by refraining from generating display of aspects of the progress bar based on the command in response to the media guidance application determining that displaying the progress bar would spoil the media asset, functionality of navigation of the user interface is maintained to the user while ensuring prevention of spoilage from being displayed.

In some embodiments, the progress bar may further comprise an elapsed time component displaying the remaining time in the media asset. In these embodiments, the media guidance application may refrain from generating display of the progress bar by generating for display a progress bar overlay comprising an altered elapsed time component different than the elapsed time component of the progress bar and positioning the progress bar overlay in the position of the progress bar. For example, if the hockey game is an overtime game, the media guidance application may replace the current program bar showing elapsed time with a progress bar overlay which shows the remaining time in the media asset at the start of the third period with a pre-defined time such as 180 minutes (indicating that no time has elapsed from the start). This time, although incorrect, acts as a placeholder as to not spoil the potential calculation of whether overtime will exist or not. As stated above, by having the media guidance application refrain from generating display of aspects of the progress bar based on the command in response to determining that displaying the progress bar would spoil the media asset, functionality of navigation of the user interface is maintained to the user while ensuring prevention of spoilage from being displayed.

In some embodiments, the media guidance application may generate, from the segment of the media asset, a segment start point and segment completion point and determine whether the current point of playback of the media asset exceeds the segment completion point. Responsive to the media guidance application determining that the current point of playback of the media asset exceeds the segment completion point, the display of the progress bar may be restored. For example, during the hockey game, if a team scored in overtime which ends the hockey game, the media guidance application may set the completion time to the time the goal is scored, as no spoilers can occur after this event. In such case, the media guidance application may restore the full display of the progress bar subsequent to the overtime goal being scored. With the media guidance application restoring the progress bar based on a determination, functionality of navigation of the user interface is maintained to the user while ensuring prevention of spoilage from being displayed.

In some embodiments, the media guidance application may receive a command from the user to override the blocked display of the progress bar. Upon the media guidance application receiving this command, the media guidance application restores the display of the progress bar. For example, during the hockey game, the media guidance application may receive a command from a user who wishes to waive the various embodiments which prevent spoilers as they wish to be able to know how much time is left. The media guidance application receives a command from the user which overrides the refrained display of the progress bar, and accordingly, the media guidance application restores full display of the progress bar.

BRIEF DESCRIPTION OF THE FIGURES

The below and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for altering or otherwise obscuring a progress bar to prevent spoilers in a media asset. In some implementations, the media guidance application generates for display a media asset. The media guidance application detects user input during playback of the media asset, and determines a segment of the media asset and the current point of playback within the media asset. The media guidance application determines the type of segment. Subsequently, the media guidance application retrieves an entry that maps the type of segment to a range of time from a database. The media guidance application computes a remaining time of the media asset by subtracting the current point of playback from a total playback time of the media asset. The media guidance application determines whether the time remaining of the media asset is within the range of time. If so, the media guidance application further determines, whether display of the progress bar would spoil the media asset. The media guidance application refrains from displaying the progress bar based on the command, in response to the determination that display of the progress bar would spoil the media asset.

Figure 1A:
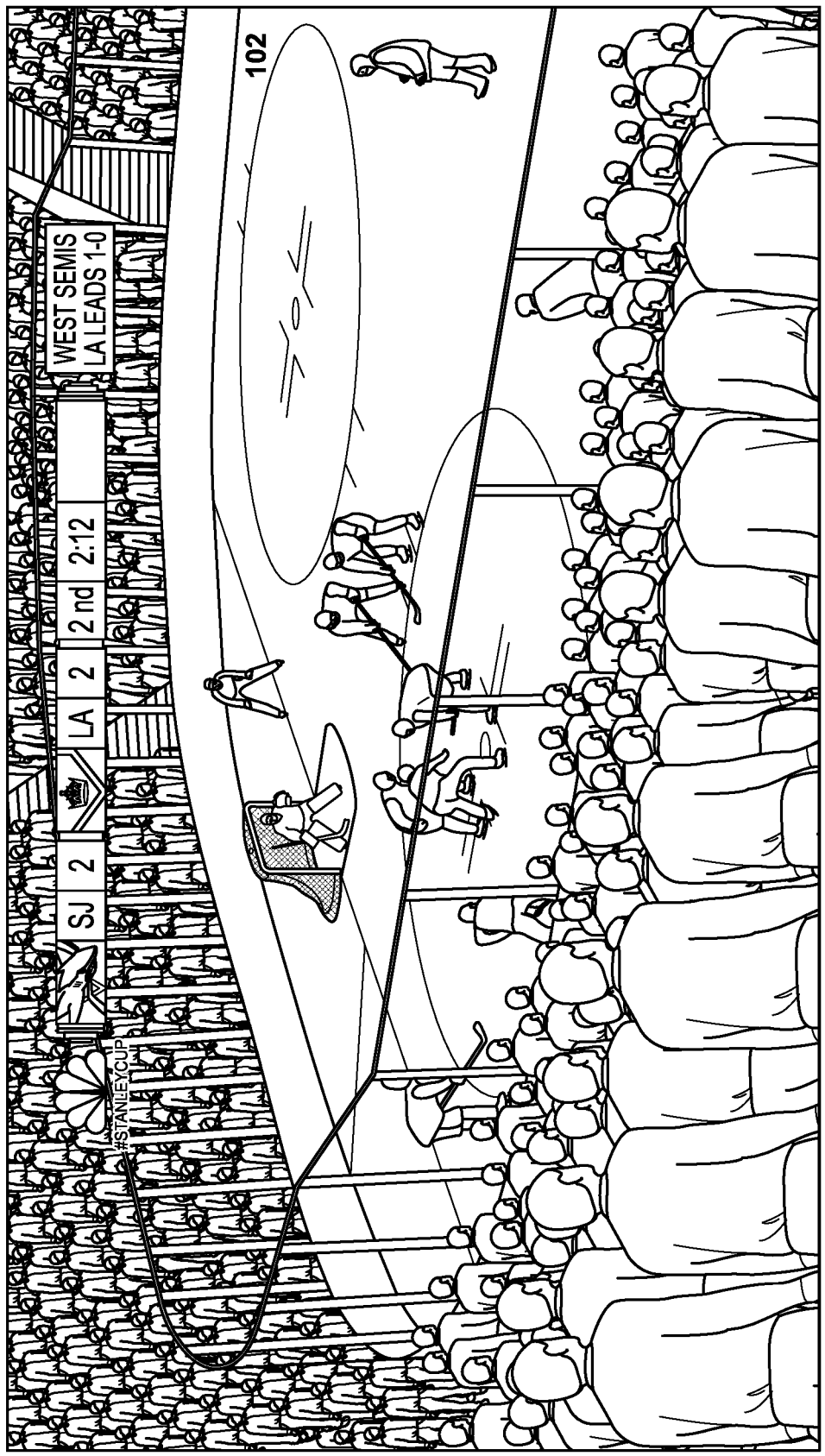
FIG. 1A shows an illustrative embodiment of a media asset displayed by a media guidance application prior to a command from a user causing display of the progress bar where the media asset has a first elapsed time value.

FIG. 1A shows an illustrative embodiment of a media asset displayed by a media guidance application prior to a command from a user causing display of the progress bar where the media asset has a first elapsed time value. The media asset 102 being displayed is a hockey game between the San Jose Sharks and the Los Angeles Kings. The televised score displayed at the top of the figure shows that the hockey game is in the second period with 2:12 minutes remaining (e.g., first elapsed time value) and the score is tied 2-2.

Figure 1B:
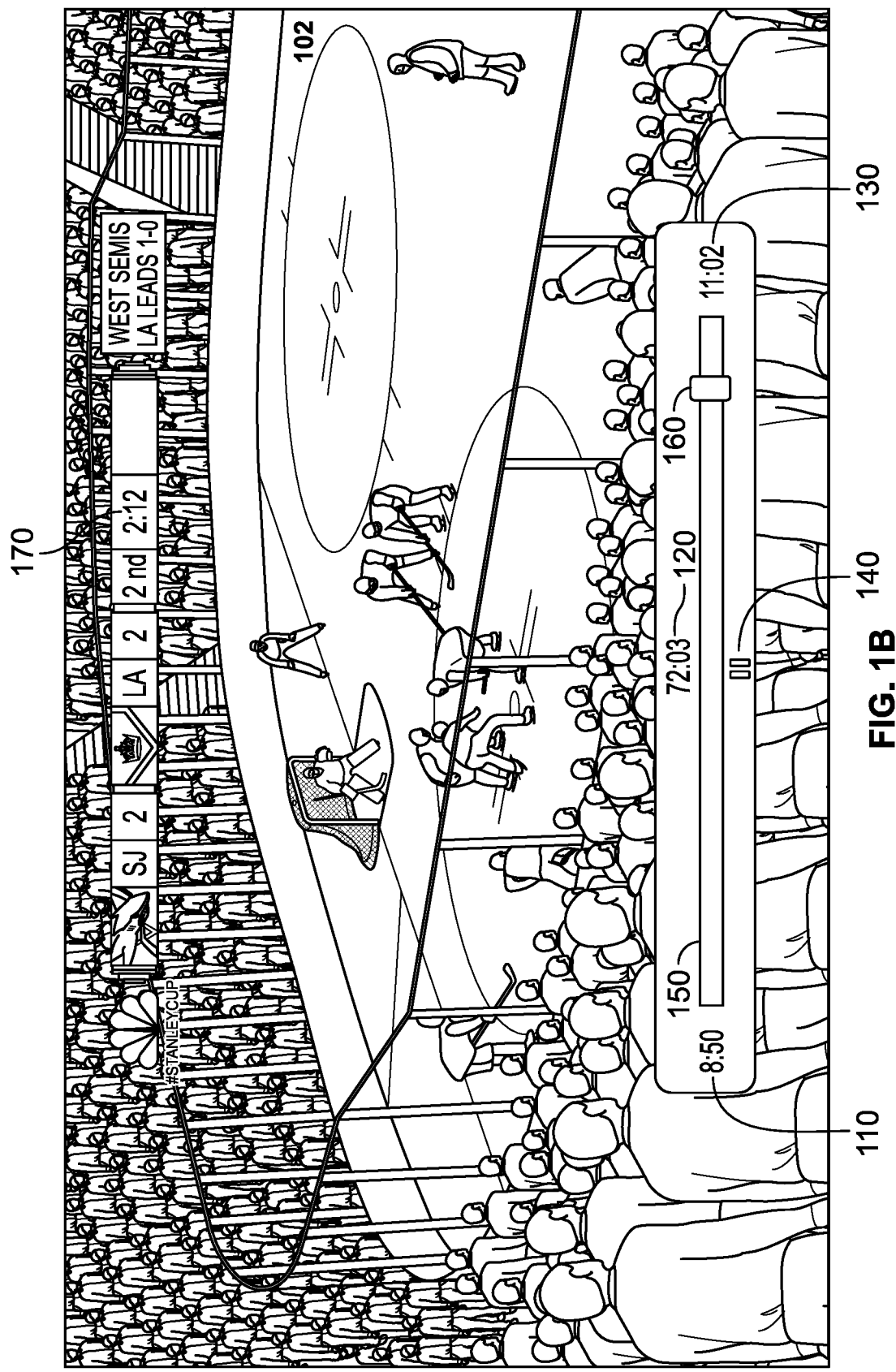
FIG. 1B shows an illustrative embodiment of a media asset displayed by a media guidance application causing display of the progress bar where the current playback position is outside of a range of time where the media asset has a first elapsed time value.

FIG. 1B shows an illustrative embodiment of a media asset displayed by a media guidance application causing display of the progress bar where the current playback position is outside of a range of time where the media asset has a first elapsed time value. FIG. 1B, illustrates the same media asset 102 as shown in FIG. 1A with the same broadcast time of 2:12 minutes (e.g., first elapsed time value). However, in contrast to FIG. 1A, a progress bar 150, is displayed at a low orientation of the display with an elapsed time component 120 stated an elapsed time of 72:03 minutes. A progress bar may be any visual interface which displays an action and/or temporal progress of the media asset. An example of a progress bar is described in U.S. Pat. No. 6,847,778, which is titled "MULTIMEDIA VISUAL PROGRESS INDICATION SYSTEM," the disclosure of which is hereby incorporated by reference herein in its entirety. In some embodiments, progress bars may be a horizontal bar representing time (e.g., progress bar 150), while in other embodiments, the progress bar may be a series of symbols indicating the temporal incrementation of the program. In some embodiments, the progress bar is a time indicator and may have no bar associated with the progress bar. The media guidance application may also display particular segment time indicators showing the start of the segment 110 which reads 8:50 minutes and the end of the segment 130 which reads 11:02 minutes. There is an indicator notch 160 as a type of elapsed time indicator shown on the progress bar 150. Finally, a pause function has been initiated 140, which was the command received by the media guidance application causing display of the progress bar 150. The elapsed time indicator may be for any measurement of time in relation to the media asset. For example, various time indicators are shown in FIG. 1B including the segment time indicators (shown in FIG. 1B as 110 and 130 respectively), indicator notch (shown in FIG. 1B as 160), and total time elapsed (shown in FIG. 1B as 120). A command may be any input from the user which is received by the media guidance application. In some embodiments, a command may be in relation to navigation of the media asset (e.g., pause, fast forward, review, skip, seek, jump, record, and other similar functions). In some embodiments, the command may be in relation to functions of the user equipment.

Figure 1C:
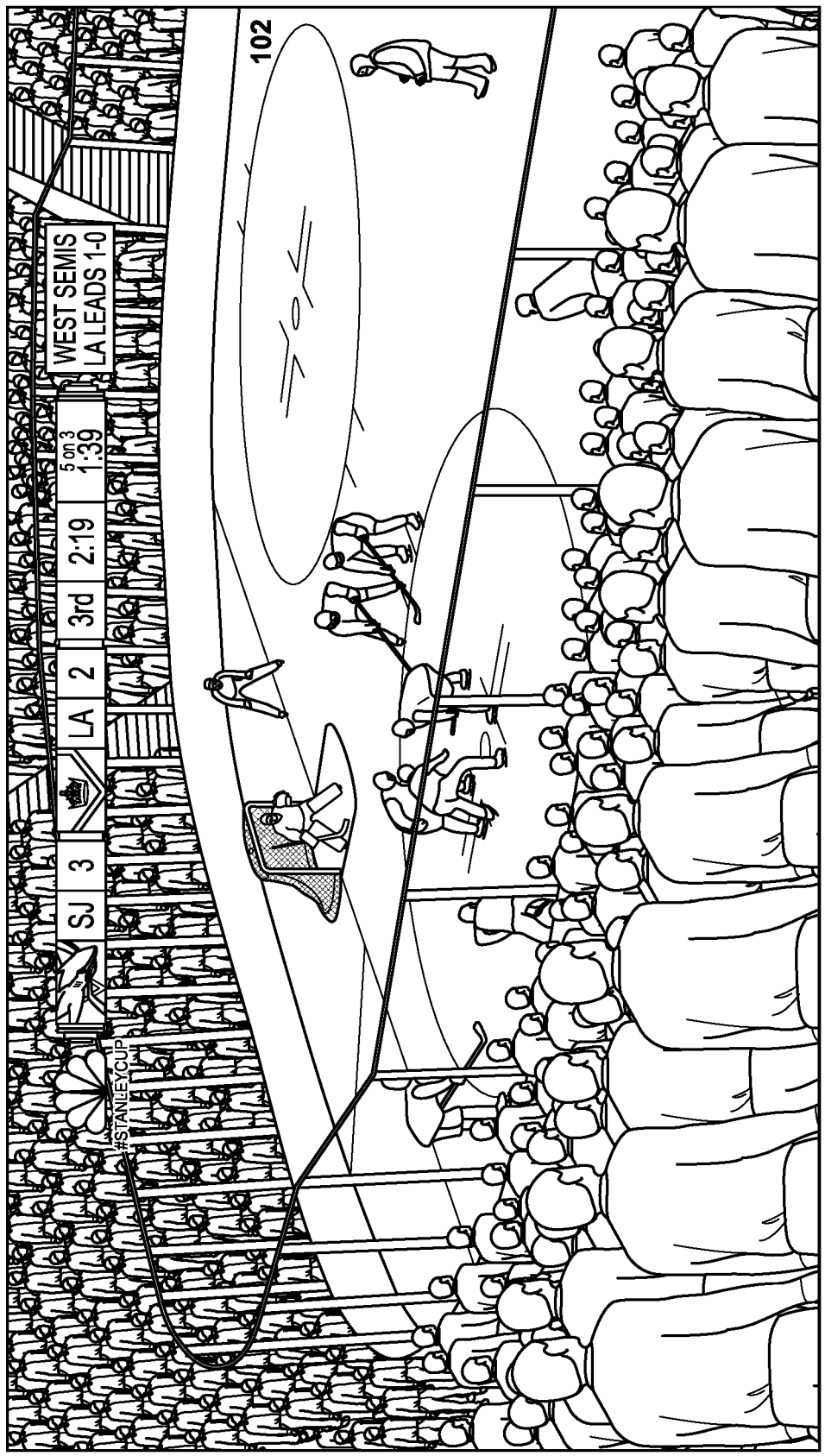
FIG. 1C shows an illustrative embodiment of a media asset displayed by a media guidance application prior to a command from a user causing display of the progress bar where the media asset has a second elapsed time value.

FIG. 1C shows an illustrative embodiment of a media asset displayed by a media guidance application prior to a command from a user causing display of the progress bar where the media asset has a second elapsed time value. The media asset 102 being displayed is the same hockey game between the San Jose Sharks and the Los Angeles Kings at a later time. The televised score displayed at the top of the figure shows that the hockey game is in the third period with 2:19 minutes remaining (e.g., second elapsed time value) and the San Jose Sharks are leading 3-2.

Figure 1D:
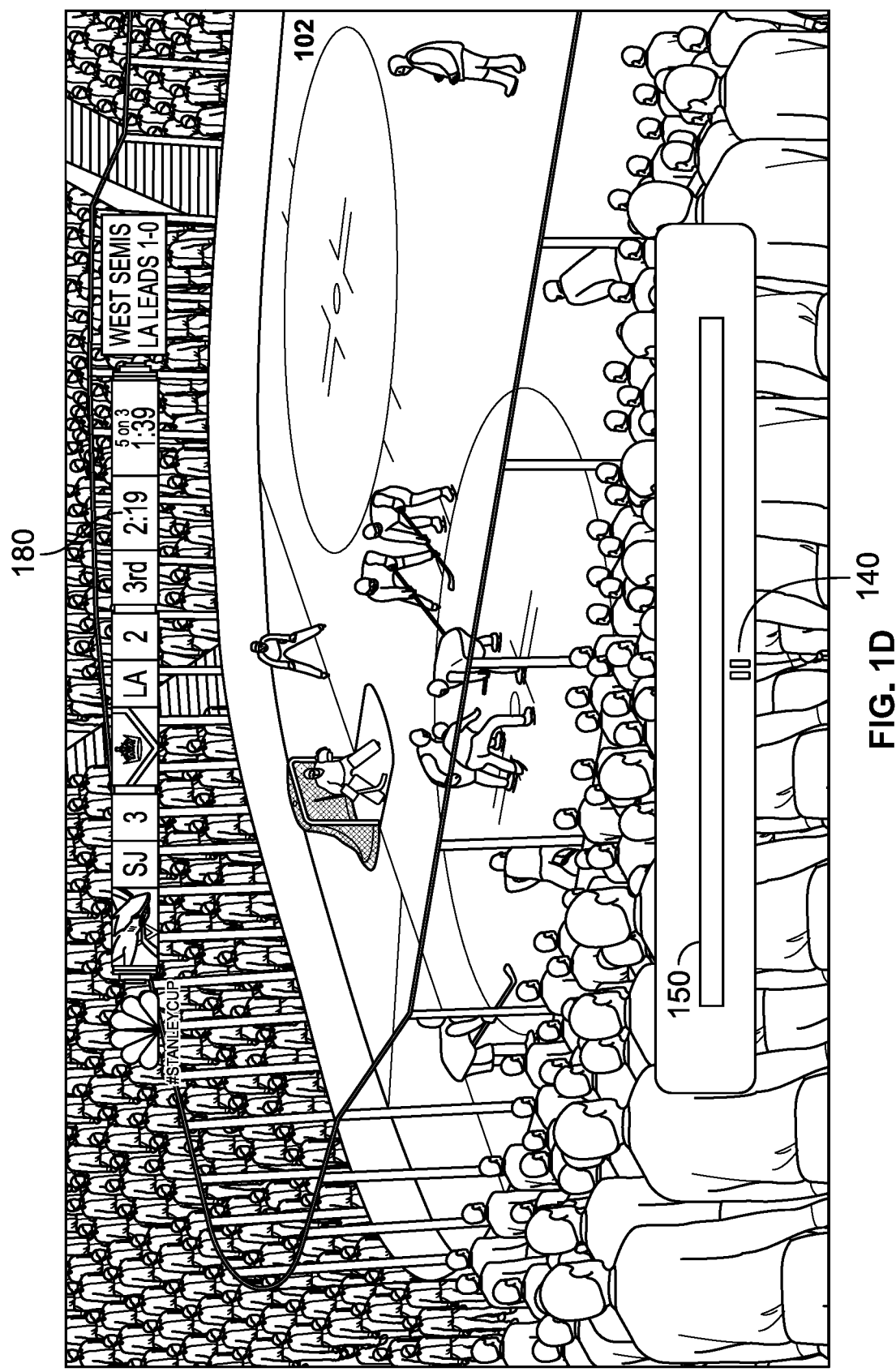
FIG. 1D shows an illustrative embodiment of a media asset displayed by a media guidance application causing display of the progress bar where the current playback position is outside of a range of time where the media asset has a second elapsed time value.

FIG. 1D shows an illustrative embodiment of a media asset displayed by a media guidance application causing display of the progress bar where the current playback position is outside of a range of time where the media asset has a second elapsed time value. FIG. 1D, illustrates the same media asset 102 as shown in FIG. 1C with the same broadcast time 180 of 2:19 minutes (e.g., second elapsed time value). However, in contrast to FIG. 1C, the progress bar 150, is displayed at a low orientation of the display with no time indicators of any kind upon the pause command which generated display of an altered progress bar. Additionally, in contrast to FIG. 1B, which displayed elapsed time 120, and segment start times 110 and segment completion time 130, as well as an indicator notch elapsed time indicator 160; FIG. 1D, has altered the progress bar to refrain from displaying any of these components to prevent spoilage. The only visual indicator is a functionality icon for pause 140. This provides for the functionality of navigation of the user interface to be maintained while ensuring prevention of spoilage from being displayed.

FIGS. 1A-D provide for embodiments which apply user equipment 400, which may include control circuitry 404, that executes a media guidance application to display the media asset (e.g., the hockey game between the San Jose Sharks and the Los Angeles Kings). In some embodiments, the control circuitry 404 may be part of a remote server which executes the media guidance application to display the media asset through remote networking between the remote server and the user equipment 400. In some embodiments, the execution of the media guidance application utilizing the remote server and/or local circuitry may include any combination of combined processing, delegation, and/or load sharing between the remote server and the user equipment. The functionality of user equipment, control circuitry, and the media guidance application is described in further detail below with respect to FIGS. 2-5.

In some embodiments, the media guidance application may generate for display a media asset. The media guidance application generates for display a media asset in response to an input received from a user for a particular media asset. For example, FIGS. 1A-1D illustrate the media guidance application generating for display a hockey game (e.g., media asset). In some embodiments, the media guidance application generates for display, a media asset in response to receiving a particular selection of a media asset from a user.

In some embodiments, the media guidance application may detect an input from a user during playback of the media asset 102. An input may be any input which is sent from the user to the media guidance application in relation to the media asset and/or the operation of the user equipment (e.g., the DVR). The input may be received by the media guidance application from a user device which is connectively coupled to the media guidance application using one or more communication means known to one of ordinary skill in the art. In some embodiments, the input may include any function which manipulates the media asset. For example, the input includes any type of navigation function of the media asset including, but not limited to, pause, fast forward, rewind, stop, record, skip, seek, jump to bookmark, jump to chapter, jump to track, and similar navigation functions. In some embodiments, the input includes a tagging functionality to tag the media asset as "liked", "favorite", "save", "add to playlist", "send to friend" (e.g., any third-party user), and similar tagging functions. In some embodiments, the input may include cursor movement and/or detection of touch on a touchscreen interface on the display 412. For example, if a cursor movement is detected, even if this movement has no functionality function to the media asset, the detected cursor movement is deemed an input.

In some embodiments, the media guidance application may determine whether the input comprises a command to display a progress bar indicating progress of the playback of the media asset 102. For example, if the media guidance application receives a command from a user which is to pause the media asset, this necessitates the media guidance application displaying the progress bar, as the progress bar provides an acknowledgement to the user of the command, as well as other auxiliary information. In another example, the media guidance application may receive a command from a user which is to shut down the user equipment. In response to receiving such a command, the media guidance application may refrain from generating for display the progress bar, as all display objects (including the media asset) are terminated. In some embodiments, the media guidance application may pre-program each command with instruction to display or not display the progress bar upon command from a user.

In some embodiments, the media guidance application may determine the current point of playback of the media asset 102. In some embodiments, the media guidance application determines the current point of playback from metadata associated with the media asset, specifically the time-based metadata component of metadata which is associated with the specific timestamp at the current point of playback. In some embodiments, the media guidance application may implement techniques for tracking elapsed time of a media asset to determine the current point of playback. An example of tracking elapsed time in a media asset is described in U.S. Pat. No. 6,847,778, which is titled "MULTIMEDIA VISUAL PROGRESS INDICATION SYSTEM," the disclosure of which is hereby incorporated by reference herein in its entirety. In some embodiments, the media guidance application may determine the current point of playback from transcript information associated with the media asset (e.g., closed captioning information). Specifically, the media guidance application may use closed captioning information associated with the current point of playback to determine the specific timestamp of the current point of playback.

In some embodiments, the media guidance application may determine a segment of the media asset comprising the current point of playback. In some embodiments, a segment may be a portion of the media asset 102 having a defined time interval. Each media asset may include a number of separate segments. Each segment may be determined based on a variety of criteria including, but not limited to, type of scene, type of actor/actress, genre, visual similarities, audio similarities, video/audio tokens, specific scene event (e.g., specific sports play, such as "goal" in hockey), and other distinct characteristics of a portion of a media asset. In some embodiments, a segment may be determined as an interval within the media asset. For example, a segment may be defined as the last two minutes of a sports match which is contentious. The determination of the specific interval may include metadata, crowdsourced user data, data from one or more media content providers, and other sources of media assets.

In some embodiments, the media guidance application may retrieve metadata corresponding to the segment from the database and determine whether the metadata matches a predetermined segment type. In some embodiments, the database includes a plurality of predetermined segment types. The database may be trained with predefined segment types by previously determined segment types, pre-defined entries from media content providers, crowdsourced user data, and other sources of pre-defined data for media assets. If the metadata matches the predetermined segment type, the media guidance application assigns the matching predetermined segment type to the type of the segment. In some embodiments, a plurality of matching techniques is employed to determine the best match from a plurality of similar pre-determined segment types. For example, if there are a number of relevant pre-determined segment types retrieved by the database based on query for a particular segment, the database will use pre-defined matching techniques to determine the most relevant pre-determined segment type. In some embodiments, the pre-defined matching technique may employ data such as user media asset history, aggregate user media asset selection, and other media asset and/or user analytics. For example, a particular predetermined segment type within the database may be "contentious playoff game" which contains the criteria that the media asset 102 be a sports match which is close in score. The database returns of number of relevant predetermined segment types including the "contentious playoff game" type. The media guidance application assigns the matching predetermined segment type to the "contentious playoff game" type of segment based on the highest score of metadata extracted from the segment using one or more pre-defined matching techniques. In some embodiments, the metadata may contain any variety of information in relation to the segment of the media asset including, but not limited to, characters (e.g., players skating within last 5 minutes), the types of scenes (e.g., recent hockey plays in last 5 minutes), whether the game is a playoff game, whether a marquee player is injured, the likelihood that a team scores in a third period, and other similar information. In some embodiments, the metadata may be a fingerprint obtained from techniques such as image recognition, video frame recognition, machine learning, and other similar techniques. In some embodiments, the database may be accessed by the media guidance application as part as part of the user equipment. In some embodiments, the database may be a third-party database which is communicatively coupled to the user equipment and accessed by the media guidance application.

In some embodiments, the media guidance application may receive transcript information corresponding to the media asset 102 and then determines a portion of the transcript information that corresponds to the segment. The media guidance application, may extract, from the portion, each word of the portion that matches any candidate type of a plurality of candidate predetermined segment types. The media guidance application may then determine, based on the extracted words, a candidate type that matches a highest amount of the extracted words and assigns the candidate type to the type of the segment. Many techniques known to one of ordinary skill in the art may be implemented for calculating matching between the candidate predetermined segment types to the candidate type. For example, the media guidance application may determine, within the closed captioning information (e.g., transcript information) for the hockey game, only the portion of the closed captioning information which corresponds to the segment of the media asset based on time-data of the closed captioning information. For example, the media guidance application may determine that the extracted words "playoff" and "post-season" from the portion of the closed captioning information from the hockey game match the "playoff game candidate type" as the highest amount of extracted words. In some embodiments, transcript information may be closed captioning text. In other embodiments, transcript information may be one or more subtitle tracks. In yet other embodiments, transcript information may be one or more commentary tracks. In yet other embodiments, transcript information may be converted speech-to-text of audio tracks within the media asset, and/or audio tracks in relation to the media asset. In some embodiments, transcript information may be a transcript of a conversation of spectators.

In some embodiments, the media guidance application may retrieve, from a database, a mapping of the type (of segment) to a range of time. In some embodiments, the media guidance application may perform the mapping by comparing the type to one or more pre-determined segment types in a database having corresponding ranges of time for a plurality of types. In some embodiments, this comparison may be performed by the media guidance application accessing a look-up table to match the type to a range of time. In some embodiments, the media guidance application may access the database as part of the user equipment. In some embodiments, the database is a third-party database which is communicatively coupled to the user equipment and accessed by the media guidance application.

In some embodiments, the media guidance application may compute a remaining time of the media asset 102 by subtracting the current point of playback from a total playback time of the media asset. In some media assets, the determination of the remaining time is used to determine whether to alter the progress bar based on events within the media asset. For example, if the media asset is a sports match, it is relevant to determine the remaining time to determine whether to obscure the progress bar to prevent spoilage. The media guidance application may then subsequently determine whether the remaining time of the media asset is within the range of time. In some embodiments, the processing for these computations is performed by an external processing entity communicatively coupled to the user equipment by the media guidance application.

In some embodiments, the media guidance application may determine whether displaying the progress bar spoils the media asset 102. This determination may be based on the media guidance application's previous determination that the remaining time of the media asset is within the range of time. Thus, in response to the media guidance application determining that the remaining time of the media asset is within the range of time, the media guidance application may determine that displaying the progress bar will spoil the media asset.

In some embodiments, the media guidance application may refrain from generating display of the progress bar based on the received command of the user. Refraining from generating display of the progress bar may be defined as any alteration to the progress bar which alters the visual appearance of the progress bar. In some embodiments, the refraining of generating display of the progress bar may include the media guidance application hiding the entire progress bar, and by extension, all information related to the progress bar. In some embodiments, the refraining of generating display of the progress bar may have the media guidance application alter the progress bar to remove all time indicators as to not give the user a sense of remaining time in total, remaining time in the segment, or other potential spoilers based on time indicators. In some embodiments, the refraining from generating display of the progress bar may have the media guidance application retain navigational functionality of the progress bar to allow the user to see visual confirmation of a navigational command (e.g., pause and play symbols are shown on the progress bar).

In some embodiments, the media guidance application may determine a duration of the segment based on a start time and a completion time of the segment. The media guidance application may then generate for display a progress bar overlay for the duration of the segment and a progress bar indicator. In some embodiments, the media guidance application may generate the progress bar overlay as the exact dimensions of the progress bar such that the media guidance application may be positioned over the progress bar to replace the progress bar. The media guidance application then determines the position of the progress bar within the media asset 102 and positions the progress bar overlay in the position of the progress bar. In some embodiments, the media guidance application may determine the position of the progress bar through information in the database. The media guidance application may optionally generate for display a notification indicating a progress bar alteration. In some embodiments, the media guidance application may generate the notification to display as a pop-up message on the display with the media asset. In some embodiments, the media guidance application may send the notification to a third-party user device communicatively coupled to the user equipment.

In some embodiments, the media guidance application may detect whether the progress bar includes an elapsed time indicator, and if an elapsed time indicator is detected, the media guidance application may remove from display of the progress bar the elapsed time indicator for the media asset 102. The media guidance application may even determine the type of the elapsed time indicator of the progress bar, and retrieve a removal action corresponding to the type of the elapsed time indicator to remove the elapsed time indicator. A removal action may be an altering of the corresponding elapsed time indicator. Specific elapsed time indicators may have corresponding specific removal actions. In some embodiments, the removal action may be to remove the visual indication of the elapsed time indicator. In some embodiments, the removal action may include removing the time indicator notch. The elapsed time indicator may be for any measurement of time in relation to the media asset. For example, various time indicators are shown in FIG. 1B including the segment time indicators (shown in FIG. 1B as 110 and 130 respectively), indicator notch (shown in FIG. 1B as 160), and total time elapsed (shown in FIG. 1B as 120). FIG. 1D provides a similar scenario where the command which displays the progress bar now hides all corresponding time indicators and solely the navigation function is displayed (shown in FIG. 1D as 140).

In some embodiments, the media guidance application may generate for display a progress bar overlay, the progress bar overlay comprising an altered elapsed time component different than the elapsed time component of the progress bar. The media guidance application may determine the position of the progress bar and positions the progress bar overlay in the position of the progress bar. The media guidance application positions the progress bar overlay such that it overlaps at least a portion of the progress bar. For example, if the media asset is an overtime hockey game, the media guidance application generates a progress bar overlay containing a pre-defined time such as 180 minutes (indicating that no time has elapsed from the start). This time, although incorrect, acts as a placeholder as to not spoil the potential calculation of whether overtime will exist or not. In some embodiments, the media guidance application may not display a time component on the progress bar overlay. In some embodiments, the media guidance application may display a time component in a static time which does not change for the duration of the segment and/or until the completion of the media asset.

In some embodiments, the media guidance application may determine whether the current point of playback of the media asset 102 exceeds the segment completion point, and responsive to this determination, the media guidance application may restore display of the progress bar. In some embodiments, the media guidance application may provide that upon completion of the segment, no spoiler prevention rules are implemented. This may be useful for media assets where spoiler prevention is required until a conclusion of an event, however this event is not the completion of the media asset.

In some embodiments, the media guidance application receives an override command from the user to restore the progress bar. For example, the media guidance application, may receive a command from the user containing instruction to display the progress bar for a hockey game without any alteration (e.g., the user may not be concerned with the media asset 102 being spoiled or not).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
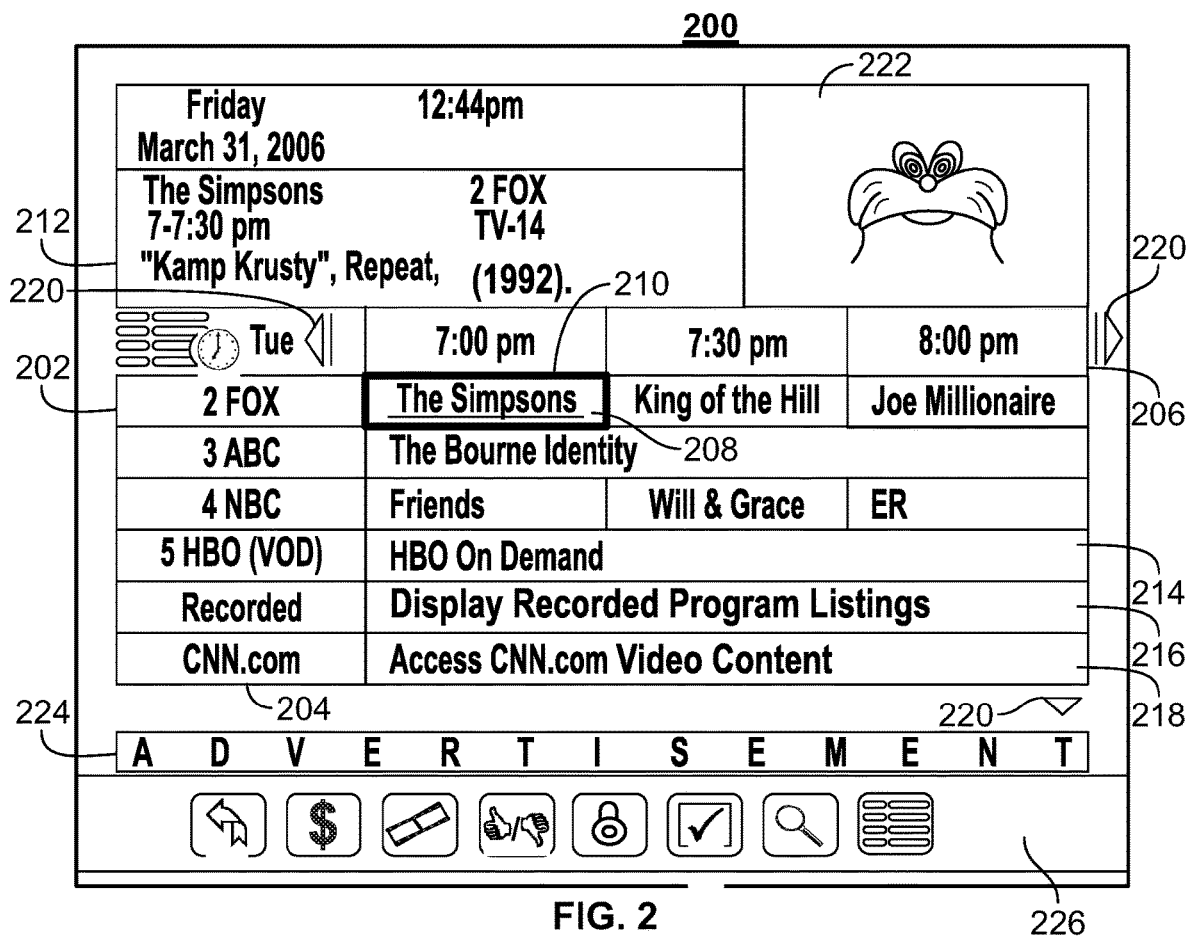
FIG. 2 shows an illustrative embodiment of a display screen that may be used to provide media guidance application listings and other media guidance information, in accordance with some embodiments of the disclosure.
Figure 3:
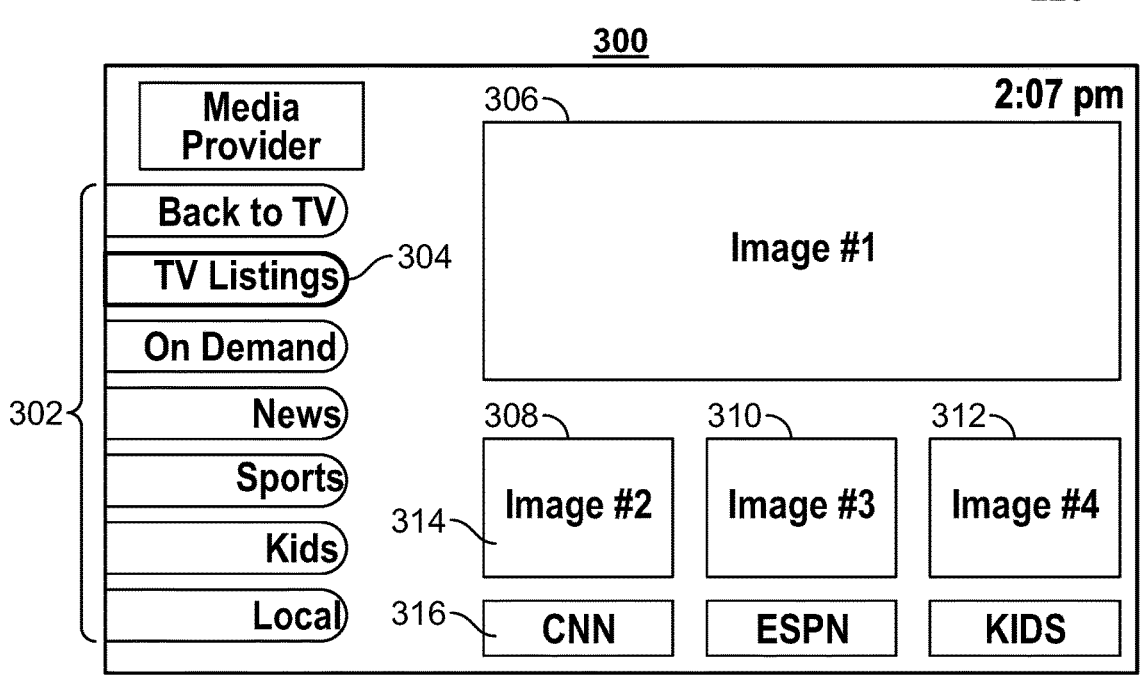
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
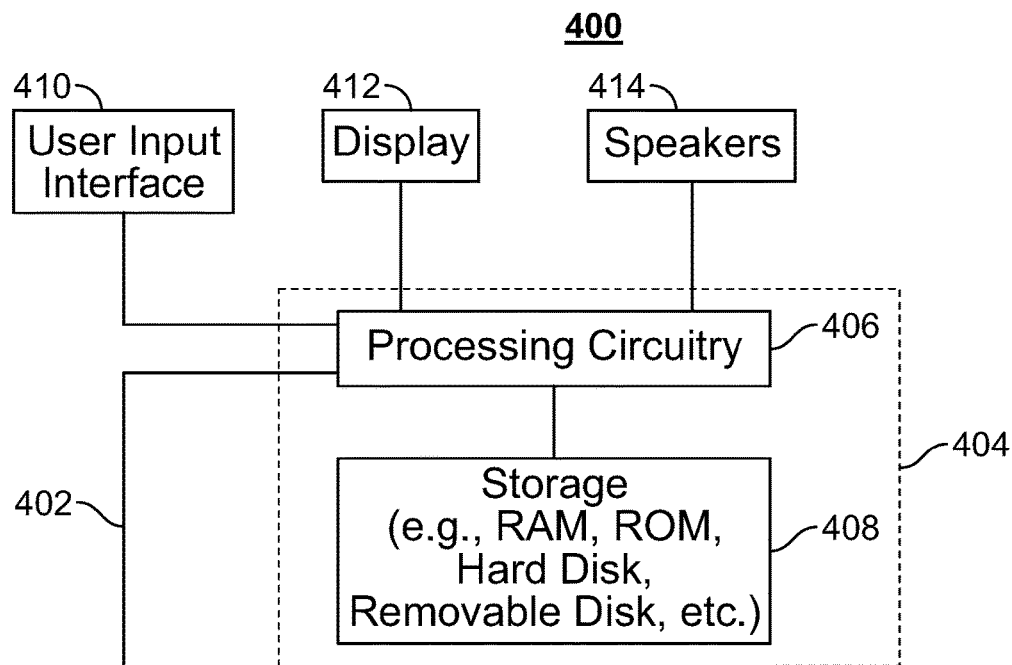
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and down converting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may generate for display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
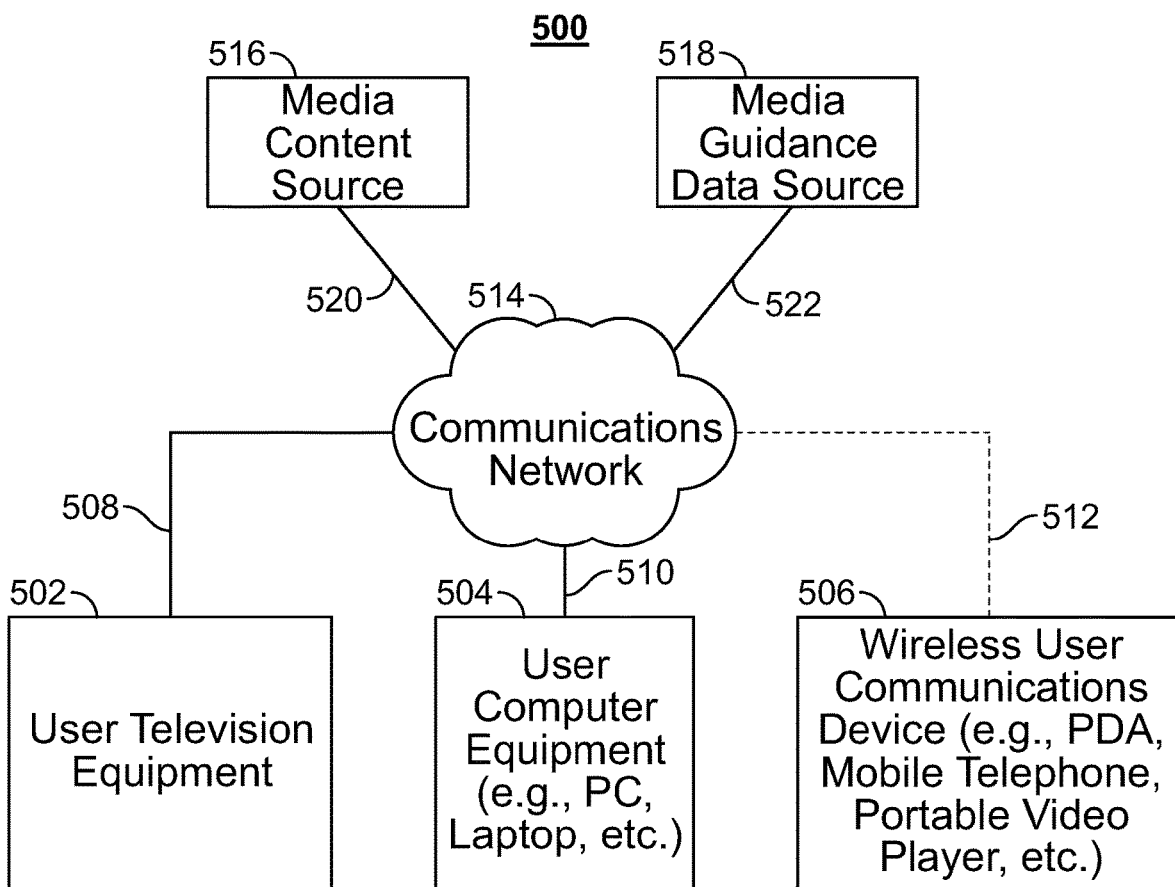
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
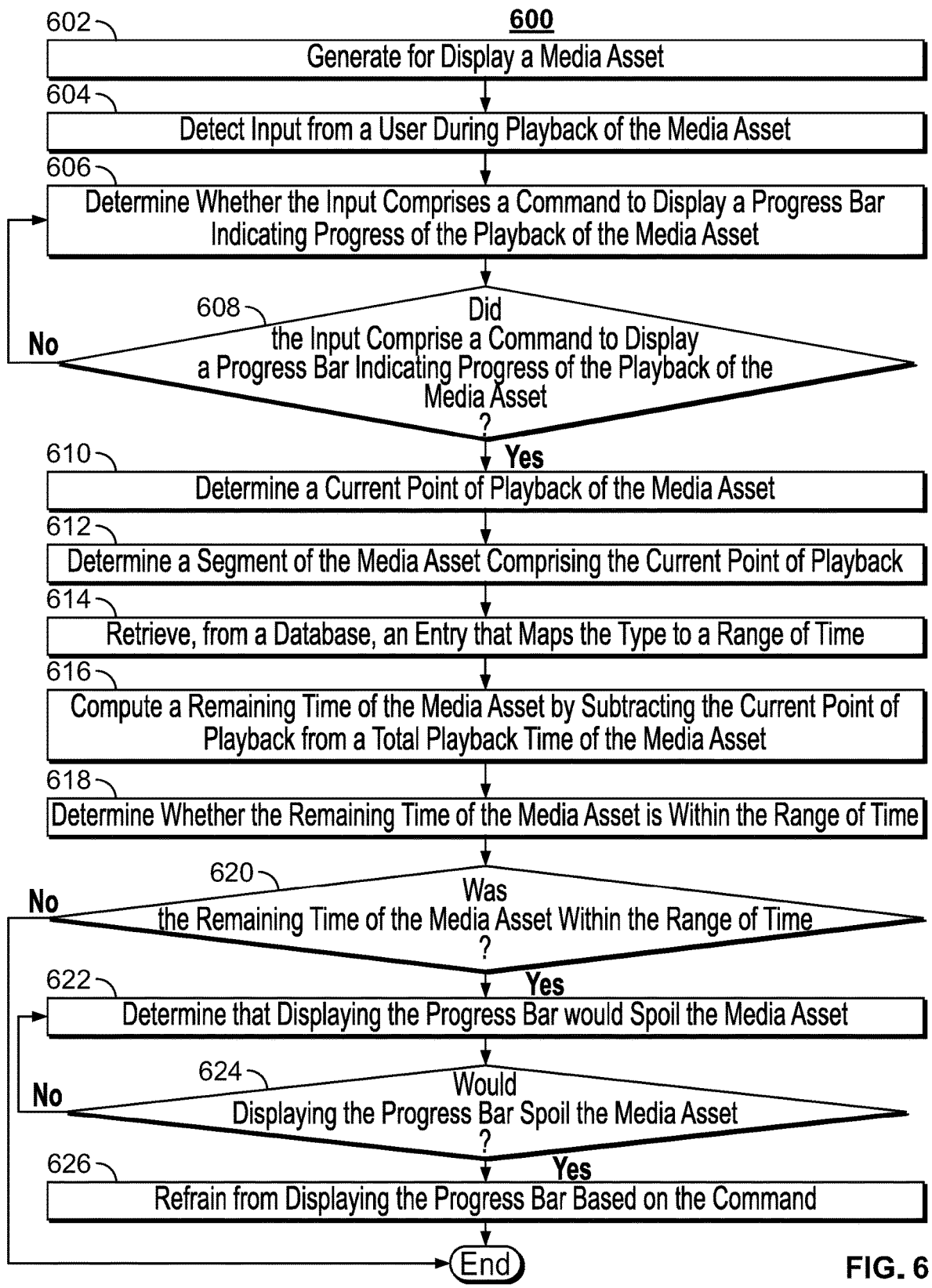
FIG. 6 depicts an illustrative flowchart of a process for of altering a progress bar to prevent spoilers in a media asset, in accordance with some embodiments of the disclosure.

FIG. 6 depicts an illustrative flowchart of a process for altering a progress bar 150 to prevent spoilers in a media asset 102, in accordance with some embodiments of the disclosure. Process 600, and any of the following processes, may be executed by control circuitry 404 (e.g., in a manner instructed to control circuitry 404 by the media guidance application). Control circuitry 404 may be part of user equipment (e.g., user equipment 100, which may have any or all of the functionality of user television equipment 502, user computer equipment 504, and/or wireless communications device 506), or of a remote server separated from the user equipment by way of communication network 514, or distributed over a combination of both.

At 602, control circuitry 404 generates for display (e.g., on a display 412), a media asset 102 from media content source 516. The media guidance application generates, by processing circuitry 406, for display a media asset in response to an input received from a user for a particular media asset. For example, FIG. 1 illustrates the media guidance application generating for display a hockey game (e.g., media asset).

At 604, control circuitry 404 detects input from a user during playback of the media asset 102 (e.g., from user input interface 410). For example, the media guidance application detects a navigation related operation command from a user, such as pausing the hockey game, of the hockey game.

At 606, control circuitry 404 determines whether the input comprises a command to display, a progress bar 150 indicating progress of the playback of the media asset 102. For example, the media guidance application detects a pause operation during display of the hockey game. The pause operation is preconfigured by the media guidance application such that the progress bar is displayed during the execution of the pause operation. Hence, the progress bar is displayed in response to the user input selecting the pause operation.

At 608, control circuitry 404 determines whether the input comprises a command to display a progress bar 150 indicating progress of the playback of the media asset 102. If, at 608, control circuitry 404 determines "No", the input does not comprise a command to display a progress bar indicating progress of the playback of the media asset, the process reverts to 606.

If, at 608, control circuitry 404 detects that "Yes", the input comprises a command to display a progress bar 150 indicating progress of the playback of the media asset 102, process 608 proceeds to 610. At 610, control circuitry 404 determines a current point of playback of the media asset. For example, the media guidance application determines that when the user pauses the hockey game, the current point of playback is at 75 minutes elapsed from start of the media asset.

At 612, control circuitry 404 determines a segment of the media asset 102 comprising the current point of playback. For example, the media guidance application determines the type of segment of the hockey game at 110 minutes elapsed from start of the media asset as the start of the second period of the game. The segment has a start and completion time of the segment which is a subset of the time of the entire asset. For example, in this case, the segment has a total time of 10 minutes.

At 614, control circuitry 404 retrieves, from a database, an entry that maps the type to a range of time. For example, the media guidance application retrieves from a database that the segment of 10 minutes of the hockey game maps to a range of time of 90 minutes elapsed from start of the media asset.

At 616, the media guidance application, by control circuitry 404, computes a remaining time of the media asset 102 by subtracting the current point of playback from a total playback time of the media asset. For example, the media guidance application calculates the remaining time of the hockey game by subtracting the 110 minutes current point of playback from the total playback time of the media asset (180 minutes). Therefore, the remaining time results in 70 minutes.

At 618, control circuitry 404 determines whether the remaining time of the media asset 102 is within the range of time. For example, the media guidance application determines that the remaining time, 70 minutes, is within the range of the remaining time of 80 minutes.

At 620, control circuitry 404 determines whether the remaining time of the media asset 102 is within the range of time. If, at 620, control circuitry 404 determines "No", the remaining time of the media asset is not within the range of time, the process advances to the end of the process.

If, at 620, control circuitry 404 detects that "Yes", the remaining time of the media asset 102 is within the range of time, process 620 proceeds to 622. At 622, control circuitry 404, determines whether displaying the progress bar 150 would spoil the media asset. For example, the media guidance application determines that the hockey game has 70 minutes remaining and display of the elapsed time of the progress bar provides a spoiler that the game will not enter overtime.

At 624, control circuitry 404 determines whether displaying the progress bar 150 spoils the media asset 102. If, at 624, control circuitry 404 determines "No", displaying the progress bar 150 does not spoil the media asset, the process advances to the end of the process.

If, at 624, control circuitry 404 detects that "Yes", displaying the progress bar 150 spoils the media asset 102, process 624 proceeds to 626. At 626, the media guidance application, by control circuitry 404, refrains from generating display of the progress bar based on the command. For example, the media guidance application alters the progress bar for the hockey game such that remaining time, and time markers within the segment, are removed from display.

Figure 7:
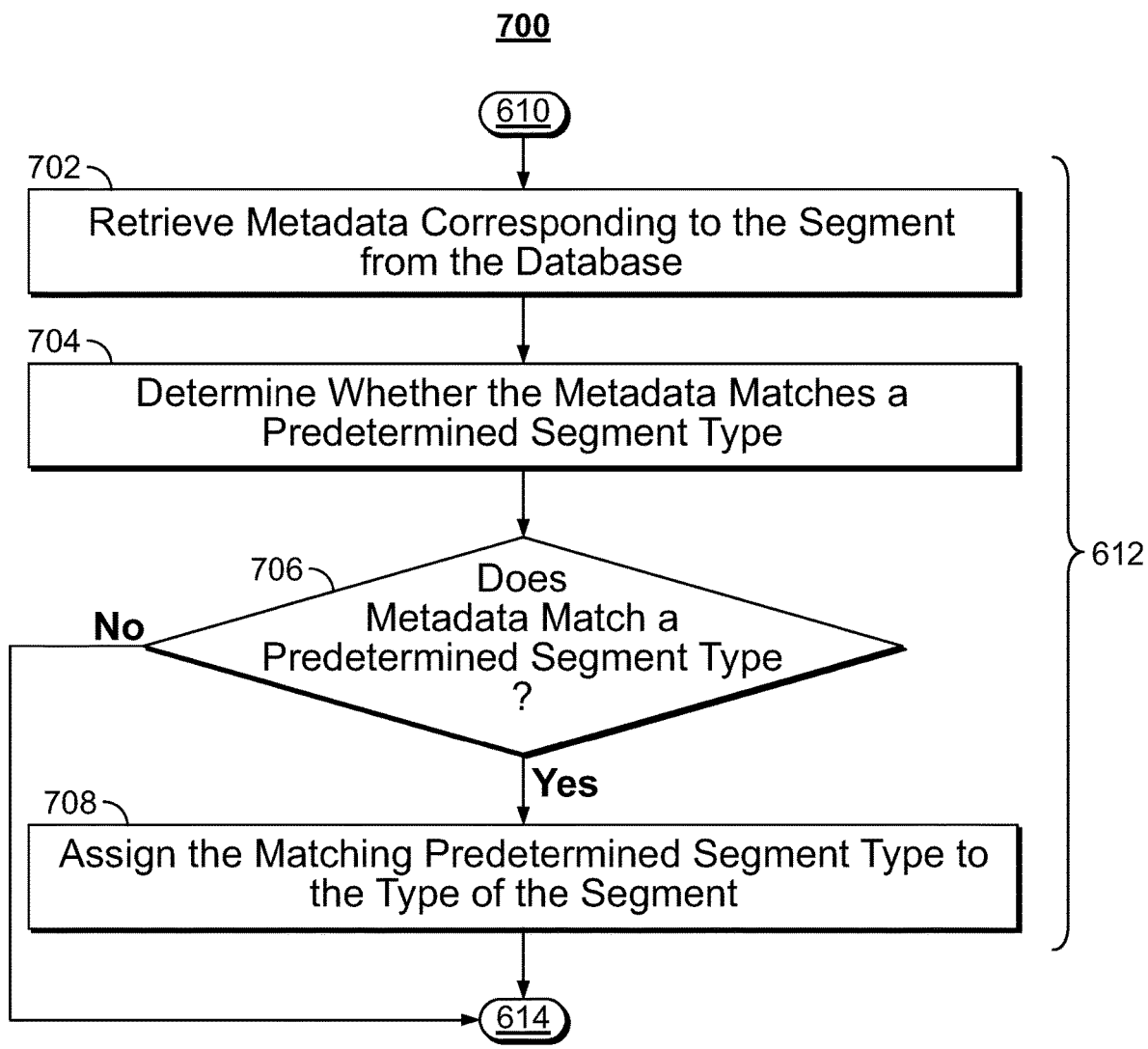
FIG. 7 depicts an illustrative flowchart of one variant for a process for determining the type of the segment, in accordance with some embodiments of the disclosure.

FIG. 7 depicts an illustrative flowchart of one variant of a process for determining the type of the segment, in accordance with some embodiments of the disclosure. At 702, the media guidance application, implemented by control circuitry 404, retrieves metadata corresponding to the segment from the database (e.g., media guidance data source 518). For example, the media guidance application receives metadata from a database for the specific 10 minute segment of the hockey game, the 10 minute segment containing the current point of playback. The metadata contains any type of information in relation to this specific segment including, but not limited to, whether the game is a playoff game, whether a marquee player is injured, the likelihood that a team scores in a third period, and other similar information.

At 704, control circuitry 404 determines whether the metadata matches a predetermined segment type. For example, the media guidance application determines that the hockey game is a playoff game and thus matches a specific segment type as to provide more aggressive protections to avoid spoilers. The predetermined segment type for playoff games provides that the range of time will correspond accordingly. Therefore, a playoff game segment type, with other metadata being equal, will have a larger range of time than a regular season segment type, with other metadata being equal.

At 706, control circuitry 404 determines whether the metadata matches a predetermined segment type. If, at 706, control circuitry 404 determines "No", the metadata does not match a predetermined segment type, the process advances to 614.

If, at 706, control circuitry 404 detects that "Yes", the metadata matches a predetermined segment type, process 706 proceeds to 708. At 708, control circuitry 404 assigns the matching predetermined segment type to the type of the segment. Continuing from the previous example, the media guidance application matches the 10 minute segment based on the metadata to a "playoff" type of predetermined segment type, and assigns this playoff segment type to the type of segment.

Figure 8:
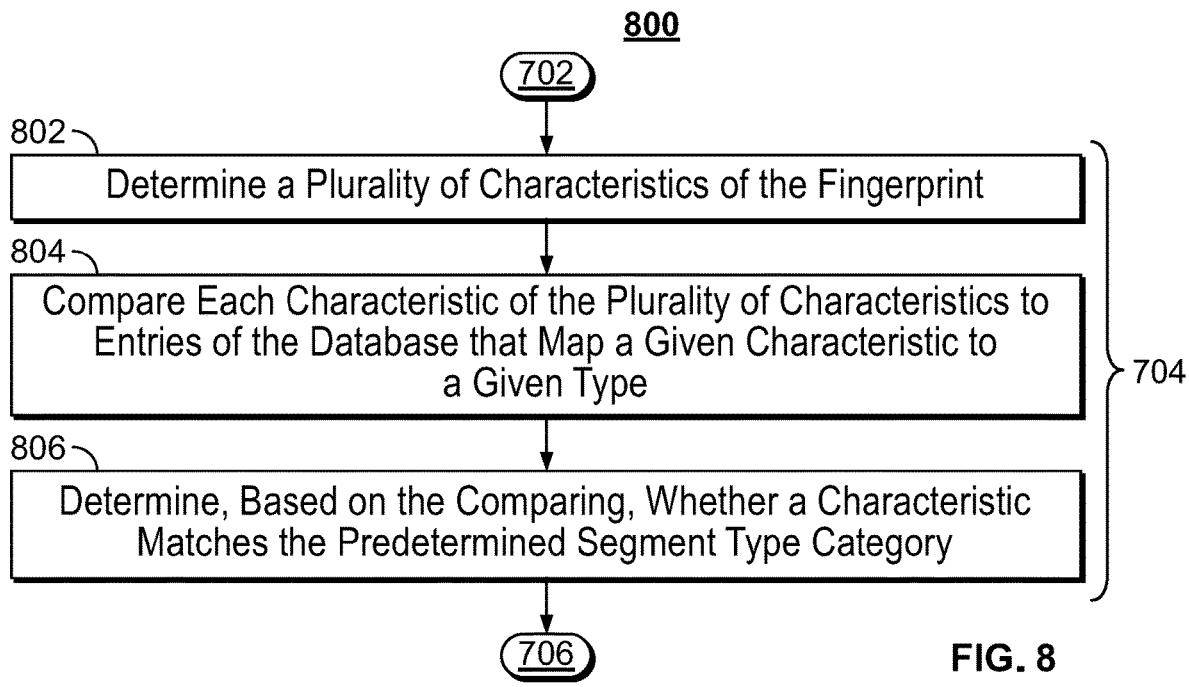
FIG. 8 depicts an illustrative flowchart of a process for determining whether the metadata matches the predetermined segment type, in accordance with some embodiments of the disclosure.

FIG. 8 depicts an illustrative flowchart of a process for determining whether the metadata matches the predetermined segment type, in accordance with some embodiments of the disclosure. At 802, control circuitry 404 determines a plurality of characteristics of the fingerprint. For example, the media guidance application uses one or more techniques to parse the media asset 102 to retrieve one or more characteristics as metadata using fingerprint techniques known to a one of ordinary skill in the art. Using these techniques, the media guidance application retrieves a number of characteristics; for example, a characteristic of the media asset is that the current hockey game is a playoff game.

At 804, control circuitry 404 compares each characteristic of the plurality of characteristics to entries of the database (e.g., media guidance data source 518) that map a given characteristic to a given type. For example, the media guidance application maps the characteristic of the hockey game being a playoff game, received from to a database, to a spoiler segment type.

At 806, control circuitry 404 determines, based on the comparing, whether a characteristic matches the predetermined segment type category. For example, the media guidance application determines that the characteristic of the hockey game being a playoff game matches the high probability of spoiler segment type (e.g., predetermined segment type).

Figure 9:
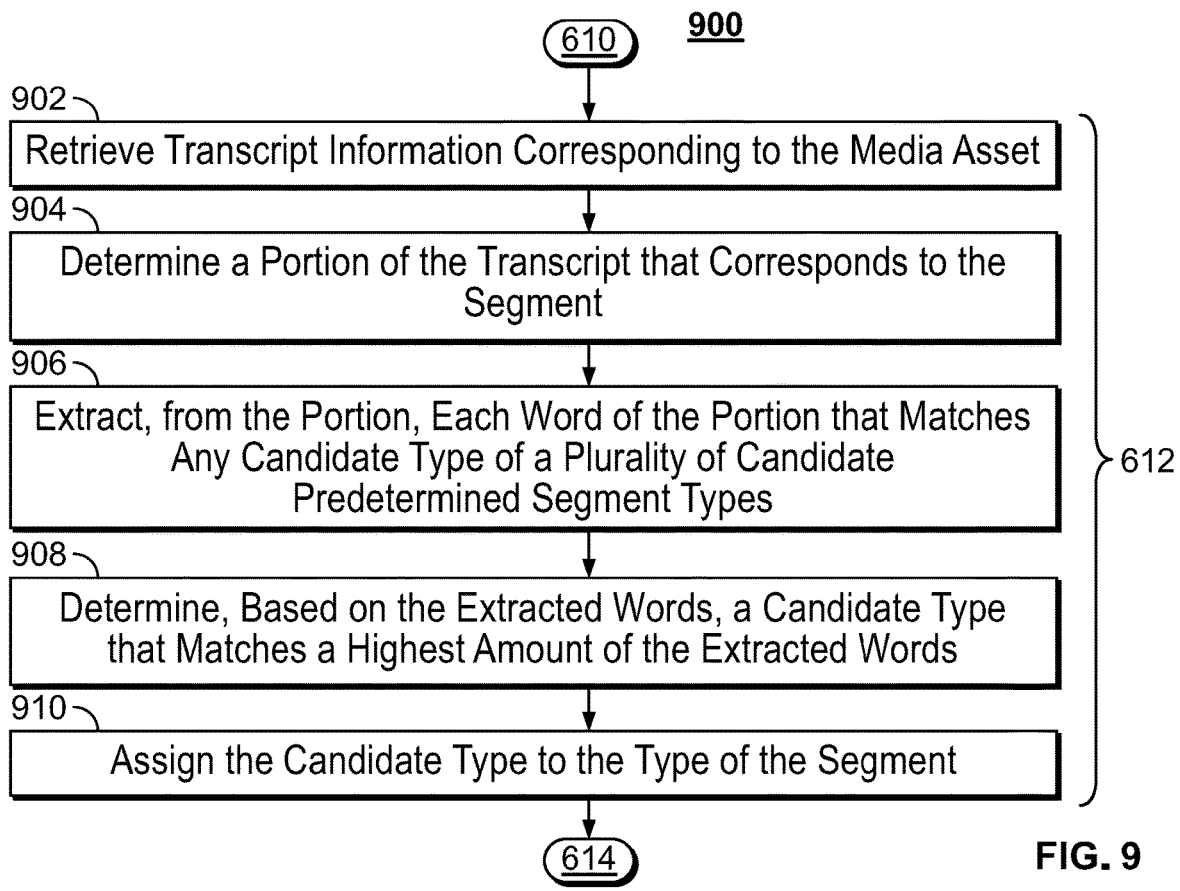
FIG. 9 depicts an illustrative flowchart of another variant for a process for determining the type of the segment, in accordance with some embodiments of the disclosure.

FIG. 9 depicts an illustrative flowchart of another variant of a process for determining the type of the segment, in accordance with some embodiments of the disclosure. At 902, the media guidance application, by control circuitry 404, retrieves transcript information corresponding to the media asset 102 (e.g., from media content source 516). For example, the media guidance application uses closed captioning information for the hockey game as the transcript information.

At 904, control circuitry 404 determines a portion of the transcript that corresponds to the segment. For example, the media guidance application determines, within the closed captioning information for the hockey game, only the portion of the closed captioning information which corresponds to the segment of the media asset 102 based on time-data of the closed captioning information.

At 906, control circuitry 404 extracts, from the portion, each word of the portion that matches any candidate type of a plurality of candidate predetermined segment types. For example, the media guidance application extracts from closed captioning information of the hockey game words in relation to various predetermined segment types which include the words "playoff", "post-season", and "Stanley Cup".

At 908, control circuitry 404 determines, based on the extracted words, a candidate type that matches a highest amount of the extracted words. For example, the extracted words "playoff", "post-season", and "Stanley Cup" from the portion of the closed captioning information from the hockey game match the "playoff game candidate type" as the highest amount of extracted words.

At 910, control circuitry 404 assigns the candidate type to the type of the segment. For example, the media guidance application, based on the playoff game candidate type having the highest amount of extracted words, assigns the playoff game candidate type to the type of segment.

Figure 10:
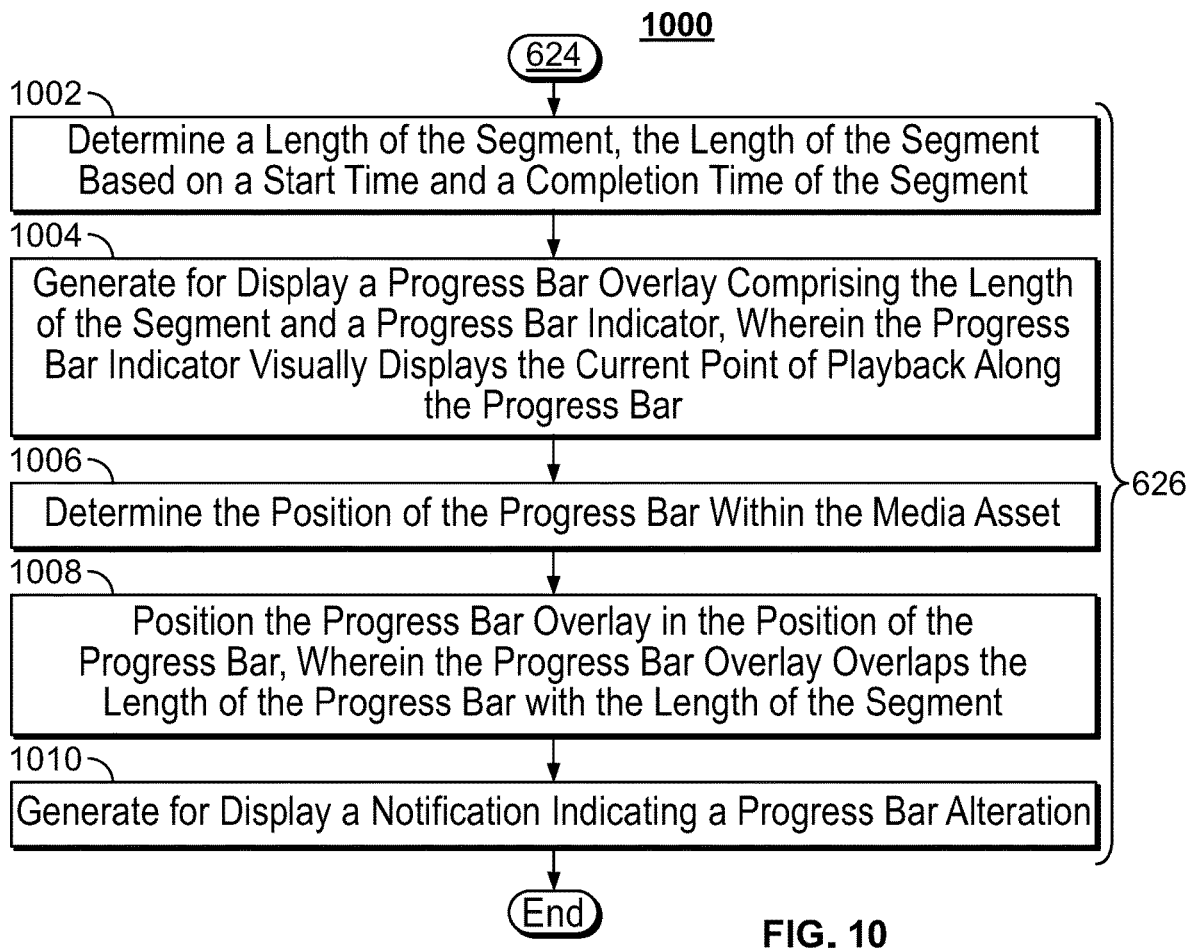
FIG. 10 depicts an illustrative flowchart of one variant for a process for refraining from generating display of the progress bar, in accordance with some embodiments of the disclosure.

FIG. 10 depicts an illustrative flowchart of one variant for a process for refraining from generating display of the progress bar 150, in accordance with some embodiments of the disclosure.

At 1002, control circuitry 404 determines a duration of the segment, the duration of the segment based on a start time and a completion time of the segment. For example, the media guidance application determines a duration of the segment of 7 minutes.

At 1004, control circuitry 404 generates for display a progress bar overlay comprising a progress bar indicator, wherein the progress bar indicator visually displays the current point of playback along the progress bar 150 for the duration of the segment (e.g., on display 412). For example, the media guidance application generates a progress bar overlay, having an indicator notch which indicates the current point of playback along the progress bar. This progress bar overlay would exist for the duration of the segment.

At 1006, control circuitry 404 determines the position of the progress bar 150 within the media asset 102. For example, the media guidance application determines that the progress bar has orientation horizontally positioned at the bottom of the display area.

At 1008, control circuitry 404 positions the progress bar overlay in the position of the progress bar (e.g., from display 412). The progress bar overlay overlaps the length of the progress bar 150. For example, the progress bar overlay completely overlaps the previously displayed progress bar, which in effect replaces the previous progress bar with the progress bar overlay.

At 1010, control circuitry 404 generates for display a notification indicating a progress bar alteration. For example, the media guidance application outputs a pop-up message to the screen that the progress bar 150 has been altered.

Figure 11:
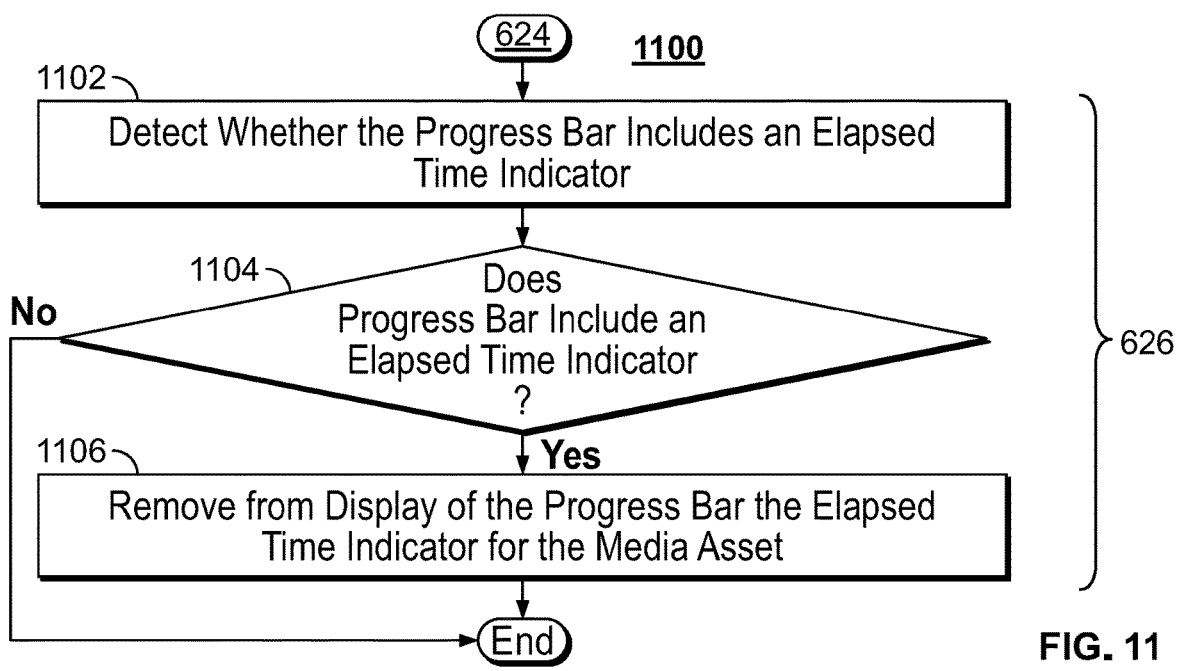
FIG. 11 depicts an illustrative flowchart of another variant for a process for refraining from generating display of the progress bar, in accordance with some embodiments of the disclosure.

FIG. 11 depicts an illustrative flowchart of another variant for a process for refraining from generating display of the progress bar 150, in accordance with some embodiments of the disclosure. At 1102, the media guidance application, by control circuitry 404, detects whether the progress bar includes an elapsed time indicator (e.g., from display 412). For example, the media guidance application determines whether the progress bar has an elapsed time indicator being visually displayed to the user for the hockey game.

At 1104, control circuitry 404 determines whether the progress bar 150 includes an elapsed time indicator (e.g., from display 412). If, at 1104, control circuitry 404 determines "No", the progress bar does not include an elapsed time indicator, the process advances to the end of the process.

If, at 1104, control circuitry 404 detects that "Yes", the progress bar 150 includes an elapsed time indicator, the process advances to 1106. At 1106, control circuitry 404 removes from display of the progress bar 150 the elapsed time indicator for the media asset 102. For example, the media guidance application displays the progress without the elapsed time indicator such that the elapsed time does not implicitly/explicitly present a spoiler to the user based on the progress bar.

Figure 12:
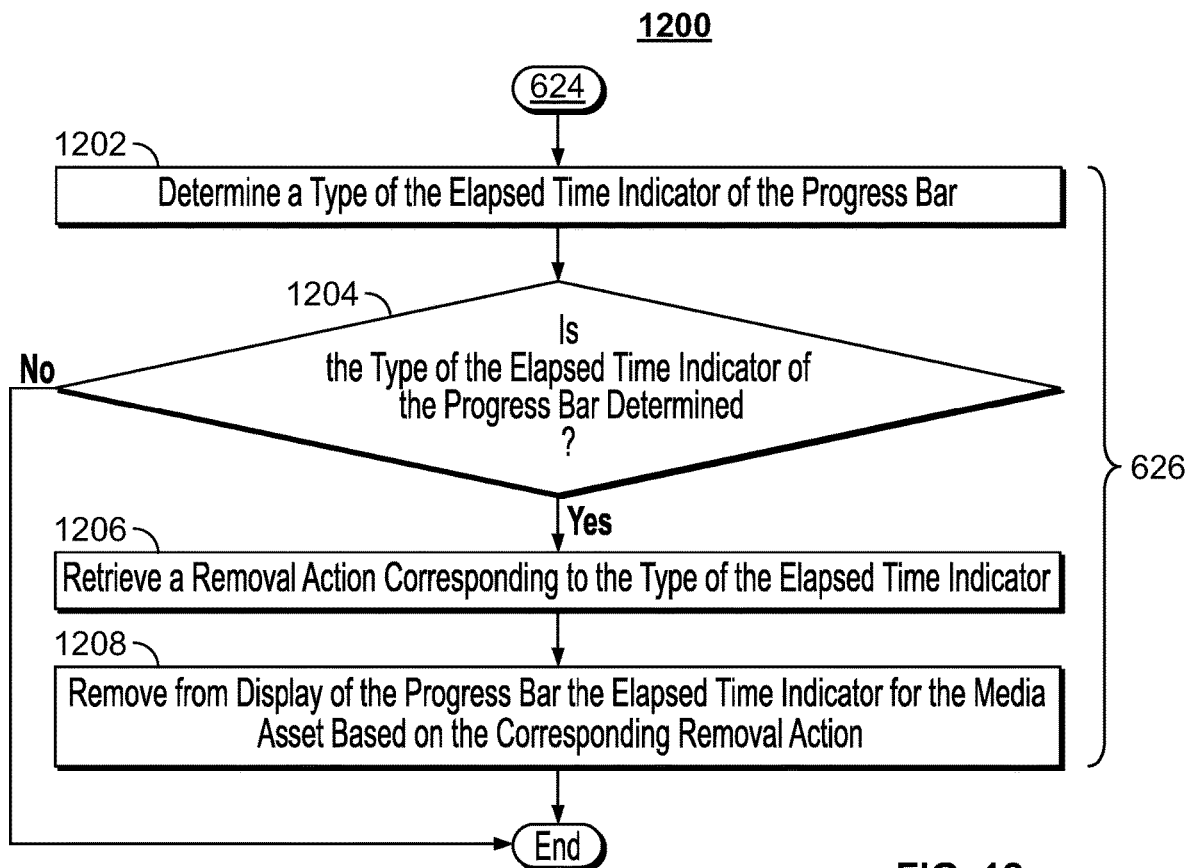
FIG. 12 depicts an illustrative flowchart for a process for detecting whether the progress bar includes an elapsed time indicator, in accordance with some embodiments of the disclosure.

FIG. 12 depicts an illustrative flowchart of another variant for a process for refraining from generating display of the progress bar 150, in accordance with some embodiments of the disclosure. At 1202, control circuitry 404 determines the type of the elapsed time indicator of the progress bar. For example, there may be a number of different elapsed time indicators including, but not limited to, time based indicators for entire media asset 102, an indicator notch on a horizontal progress bar, among other varieties.

At 1204, the media guidance application, by control circuitry 404, determines whether the type of the elapsed time indicator of the progress bar has been determined. If, at 1204, control circuitry 404 determines "No", the type of the elapsed time indicator of the progress bar has not been determined, the process advances to the end of the process.

If, at 1204, control circuitry 404 detects that "Yes", the type of the elapsed time indicator of the progress bar has been determined, the process advances to 1206. At 1206, control circuitry 404 retrieves a removal action corresponding to the type of the elapsed time indicator. For example, the media guidance application determines that the elapsed time indicator is an indicator notch on a horizontal progress bar, the corresponding removal action is to remove the indicator notch from the horizontal progress bar leaving just the horizontal progress bar 150 without the indicator notch.

At 1208, the media guidance application, by control circuitry 404, removes from display of the progress bar 150, the elapsed time indicator for the media asset 102 based on the corresponding removal action. For example, the media guidance application removes the indicator notch from the horizontal progress bar.

Figure 13:
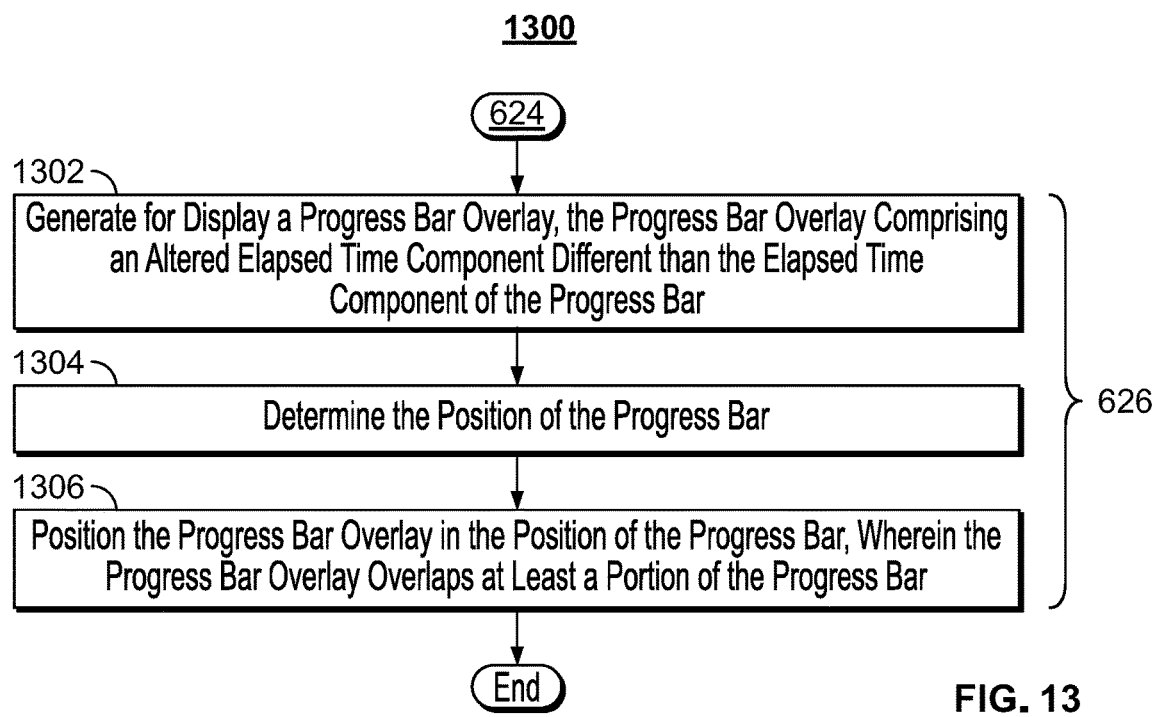
FIG. 13 depicts an illustrative flowchart of yet another variant for a process for refraining from generating display of the progress bar, in accordance with some embodiments of the disclosure.

FIG. 13 depicts an illustrative flowchart of yet another variant for a process for refraining from generating display of the progress bar 150, in accordance with some embodiments of the disclosure. At 1302, control circuitry 404 generates for display a progress bar overlay, the progress bar overlay comprising an altered elapsed time component different than the elapsed time component of the progress bar (e.g., on display 412). For example, if the hockey game is an overtime game, the media guidance application generates a progress bar overlay containing a pre-defined time such as 180 minutes (indicating that no time has elapsed from the start). This time, although incorrect, acts as a placeholder as to not spoil the potential calculation of whether overtime will exist or not.

At 1304, control circuitry 404 determines the position of the progress bar (e.g., on display 412). For example, the media guidance application determines that the progress bar 150 is orientated horizontally on the lower part of the display.

At 1306, control circuitry 404 positions the progress bar overlay in the position of the progress bar 150, wherein the progress bar overlay overlaps at least a portion of the progress bar (e.g., on display 412). For example, the media guidance application positions the progress bar overlay exactly over the position of the progress bar as to appear to replace the progress bar with the progress bar overlay.

Figure 14:
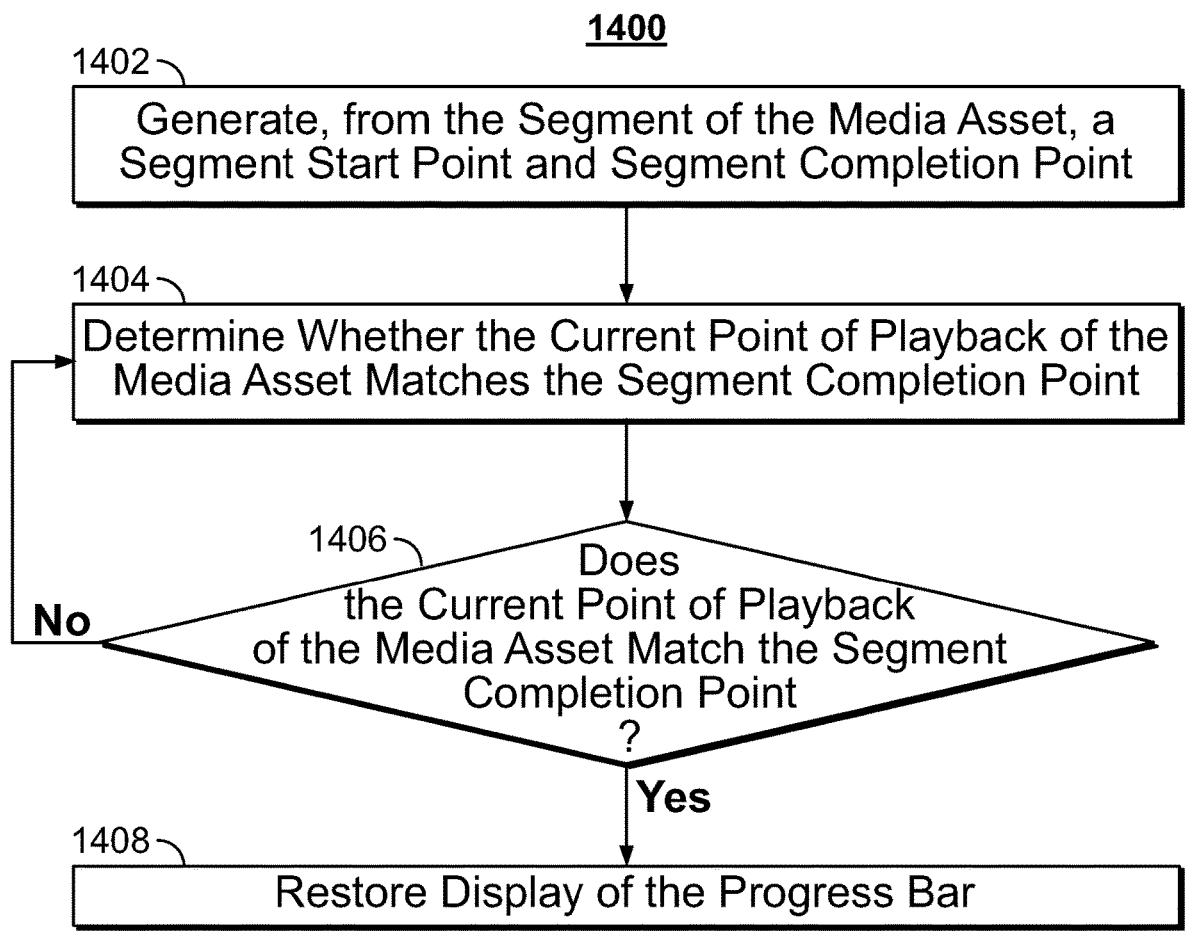
FIG. 14 depicts an illustrative flowchart of one variant for restoring display of the progress bar, in accordance with some embodiments of the disclosure.

FIG. 14 depicts an illustrative flowchart of one variant for restoring display of the progress bar 150, in accordance with some embodiments of the disclosure. At 1402, the media guidance application, by control circuitry 404, generates, from the segment of the media asset 102, a segment start point and segment completion point. For example, the media guidance application, from the segment, determines that the hockey game is an overtime match and the start point of the overtime is 12:00 minutes (measured from time elapsed since previous media asset segment) and a completion point 15:00 minutes which is when the overtime goal is scored (measured from time since the previous media asset segment).

At 1404, control circuitry 404 determines whether the current point of playback of the media asset 102 exceeds the segment completion point. For example, the media guidance application determines the current point of playback is 15:03 minutes. The current point of playback exceeds the segment completion point (e.g., 15:00 minutes).

At 1406, control circuitry 404 determines whether the current point of playback of the media asset 102 exceeds the segment completion point. If, at 1406, control circuitry 404 determines "No", the current point of playback of the media asset does not exceed the segment completion point, process reverts to 1404.

If, at 1406, control circuitry 404 detects that "Yes", the current point of playback of the media asset 102 exceeds the segment completion point, the process advances to 1407. At 1407, control circuitry 404 restores display of the progress bar 150. For example, the media guidance application restores the progress bar for display.

Figure 15:
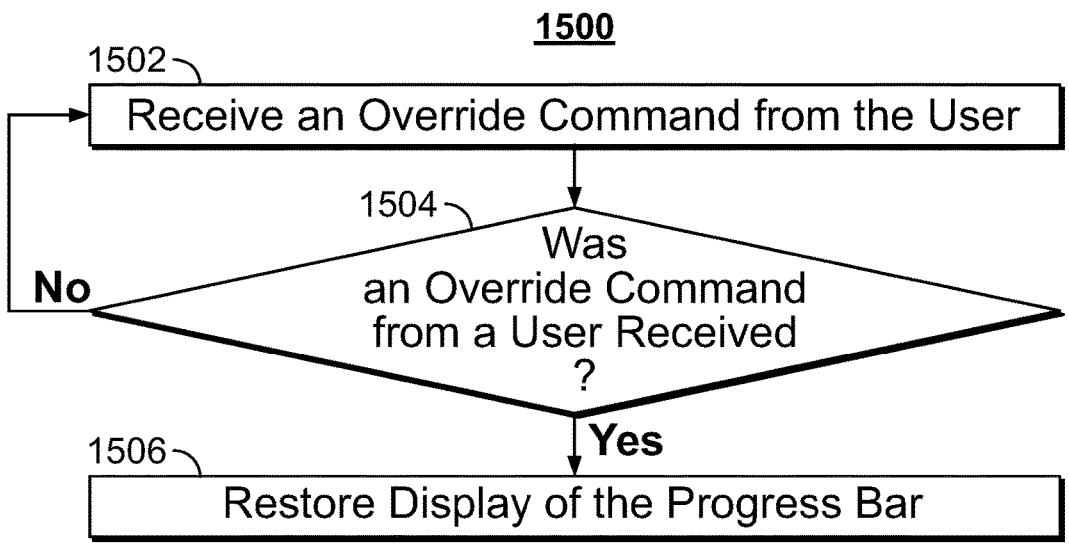
FIG. 15 depicts an illustrative flowchart of another variant for restoring display of the progress bar, in accordance with some embodiments of the disclosure.

FIG. 15 depicts an illustrative flowchart of another variant for restoring display of the progress bar 150, in accordance with some embodiments of the disclosure. At 1502, control circuitry 404 receives an override command from the user (e.g., by user input interface 410). For example, the media guidance application, receives a command from the user containing instruction to display the progress bar for a hockey game without any alteration (e.g., the user may not be concerned with the media asset 102 being spoiled or not).

At 1504, control circuitry 404 determines whether an override command from a user was received. If, at 1504, control circuitry 404 determines "No", an override command from a user was not received, then the process reverts to 1502.

If, at 1504, control circuitry 404 detects that "Yes", an override command from a user was received, the process advances to 1506. At 1506, control circuitry 404 restores display of the progress bar 150. For example, the media guidance application restores the progress bar for the hockey game without any alteration.

It should be noted that processes 600-1500 or any step thereof could be performed on, or provided by, any of the devices shown in FIGS. 1 and 4-5. For example, any of processes 600-1000 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-1500 may be incorporated into or combined with one or more steps of any other process or embodiment.

It is contemplated that the steps or descriptions of each of FIGS. 6-15 may be used with any other embodiment of this disclosure. In addition, the steps and descriptions described in relation to FIGS. 6-15 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-15.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "related art" or "convention," any such reference is merely for the purpose of providing context to the invention(s) of the instant disclosure, and does not form any admission as to what constitutes the state of the art.

What is claimed is:

1. A method for preventing spoilers from progress bar displays, the method comprising:
   detecting an input at a temporal point while a media asset is generated for display;
   determining whether the input at the temporal point comprises a command to display a progress bar indicating the temporal progress of the media asset; and
   in response to the determination that the input at the temporal point comprises the command to display the progress bar:
   retrieving metadata of the media asset associated with the temporal point, wherein the metadata comprises a type of scene associated with the temporal point;
   determining whether the type of scene matches at least one of a plurality of spoiler scene types; and
   in response to the determination that the type of scene matches at least one of the plurality of spoiler scene types, refraining from generating display of the progress bar.

2. The method of claim 1, further comprising:
   in response to the determination that the type of scene does not match at least one of the plurality of spoiler scene types, generating display of the progress bar.

3. The method of claim 1, wherein spoiler scene types comprise at least one of recent sports plays within a defined time period within a scene and types of characters in a scene.

4. The method of claim 1, wherein the retrieving metadata of the media asset associated with the temporal point, wherein the metadata comprises a type of scene associated with the temporal point comprises:
   retrieving transcript information corresponding to the media asset;
   determining a portion of the transcript that corresponds to the temporal point; and
   extracting, from the portion, each word of the portion.

5. The method of claim 1, wherein refraining from generating display of the progress bar comprises refraining from generating display of the progress bar for a specific temporal duration.

6. The method of claim 5, further comprising:
   determining a temporal duration of the type of scene; and
   assigning the determined temporal duration of the type of scene to the specific temporal duration.

7. The method of claim 1, wherein refraining from generating display of the progress bar further comprises:
   detecting whether the progress bar includes an elapsed time indicator; and
   in response to the detection that the progress bar includes an elapsed time indicator, removing from display of the progress bar the elapsed time indicator.

8. The method of claim 7, wherein detecting whether the progress bar includes an elapsed time indicator further comprises:
   determining a type of the elapsed time indicator of the progress bar; and
   in response to determining the type of the elapsed time indicator of the progress bar:
   retrieving a removal action corresponding to the type of the elapsed time indicator; and
   removing from display of the progress bar the elapsed time indicator based on the retrieved removal action.

9. The method of claim 1, wherein the progress bar further comprises an elapsed time component displaying the remaining time in the media asset, and wherein refraining from generating display of the progress bar further comprises:
   generating for display a progress bar overlay, the progress bar overlay comprising an altered elapsed time component different than the elapsed time component of the progress bar;
   determining the position of the progress bar; and
   positioning the progress bar overlay in the position of the progress bar, wherein the progress bar overlay overlaps at least a portion of the progress bar.

10. The method of claim 1 further comprises:
    generating, from the type of scene, a scene start point and scene completion point;

determining whether the temporal point of the media asset exceeds the scene completion point; and in response to the determination that the temporal point exceeds the scene completion point, restoring generation for display of the progress bar.

11. A system for preventing spoilers from progress bar displays, the system comprising:

control circuitry configured to:
- detect an input at a temporal point while a media asset is generated for display;
- determine whether the input at the temporal point comprises a command to display a progress bar indicating the temporal progress of the media asset; and
- in response to the determination that the input at the temporal point comprises the command to display the progress bar:
  - retrieve metadata of the media asset associated with the temporal point, wherein the metadata comprises a type of scene associated with the temporal point;
  - determine whether the type of scene matches at least one of a plurality of spoiler scene types; and
  - in response to the determination that the type of scene matches at least one of the plurality of spoiler scene types, refrain from generating display of the progress bar.

12. The system of claim 11, wherein the control circuitry is further configured to:
in response to the determination that the type of scene does not match at least one of the plurality of spoiler scene types, generate display of the progress bar.

13. The system of claim 11, wherein spoiler scene types comprise at least one of recent sports plays within a defined time period within a scene and types of characters in a scene.

14. The system of claim 11, wherein the control circuitry is configured, when retrieving metadata of the media asset associated with the temporal point, wherein the metadata comprises a type of scene associated with the temporal point, to:
- retrieve transcript information corresponding to the media asset;
- determine a portion of the transcript that corresponds to the temporal point; and
- extract, from the portion, each word of the portion.

15. The system of claim 11, wherein the control circuitry is configured, when refraining from generating display of the progress bar, to refrain from generating display of the progress bar for a specific temporal duration.

16. The system of claim 15, wherein the control circuitry is further configured to:
- determine a temporal duration of the type of scene; and
- assign the determined temporal duration of the type of scene to the specific temporal duration.

17. The system of claim 11, wherein the control circuitry is further configured to, when refraining from generating display of the progress bar, to:
- detect whether the progress bar includes an elapsed time indicator; and
- in response to the detection that the progress bar includes an elapsed time indicator, remove from display of the progress bar the elapsed time indicator.

18. The system of claim 17, wherein the control circuitry is further configured to, detecting whether the progress bar includes an elapsed time indicator, to:
- determine a type of the elapsed time indicator of the progress bar; and
- in response to determining the type of the elapsed time indicator of the progress bar:
  - retrieve a removal action corresponding to the type of the elapsed time indicator; and
  - remove from display of the progress bar the elapsed time indicator based on the retrieved removal action.

19. The system of claim 11, wherein the progress bar further comprises an elapsed time component displaying the remaining time in the media asset, and wherein the control circuitry is further configured to, when refraining from generating display of the progress bar, to:
- generate for display a progress bar overlay, the progress bar overlay comprising an altered elapsed time component different than the elapsed time component of the progress bar;
- determine the position of the progress bar; and
- position the progress bar overlay in the position of the progress bar, wherein the progress bar overlay overlaps at least a portion of the progress bar.

20. The system of claim 11 wherein the control circuitry is further configured to:
- generate, from the type of scene, a scene start point and scene completion point;
- determine whether the temporal point of the media asset exceeds the scene completion point; and
- in response to the determination that the temporal point exceeds the scene completion point, restore generation for display of the progress bar.

* * * * *